United States Patent [19]

Yanagi

[11] Patent Number: 5,675,562

[45] Date of Patent: Oct. 7, 1997

[54] SEEK CONTROL METHOD IN OPTICAL STORAGE DEVICE

[75] Inventor: Shigenori Yanagi, Kawasaki, Japan

[73] Assignee: Fujitsu Limited, Kawasaki, Japan

[21] Appl. No.: 608,445

[22] Filed: Feb. 28, 1996

[30] Foreign Application Priority Data

Mar. 20, 1995 [JP] Japan ................................ 7-060280
Sep. 13, 1995 [JP] Japan ................................ 7-235282

[51] Int. Cl.$^6$ ................................................ G11B 7/085
[52] U.S. Cl. ........................ 369/44.28; 369/32; 369/44.34
[58] Field of Search ............................. 369/44.28, 44.29, 369/44.34, 32; 360/78.05, 78.08

[56] References Cited

U.S. PATENT DOCUMENTS

| | | | |
|---|---|---|---|
| 4,627,038 | 12/1986 | Abed et al. | 369/30 |
| 4,827,200 | 5/1989 | Shirou et al. | 318/561 |
| 4,972,350 | 11/1990 | Sander et al. | 369/44.28 |
| 5,005,089 | 4/1991 | Thanos | 360/77.08 |
| 5,063,549 | 11/1991 | Yamamuro | 369/44.28 |
| 5,088,075 | 2/1992 | Yokota | 369/44.28 |
| 5,228,019 | 7/1993 | Yanagi | 369/44.28 |
| 5,457,671 | 10/1995 | Takata et al. | 369/44.28 |

FOREIGN PATENT DOCUMENTS

| | | |
|---|---|---|
| 05492820 | 6/1993 | European Pat. Off. |
| 62-110678 | 5/1987 | Japan |
| 62-120675 | 6/1987 | Japan |
| 62-185284 | 8/1987 | Japan |
| 62-231430 | 10/1987 | Japan |
| 63-26833 | 2/1988 | Japan |
| 63-173230 | 7/1988 | Japan |
| 35975 | 1/1991 | Japan |
| 3152726 | 6/1991 | Japan |
| 581799 | 4/1993 | Japan |
| 5120701 | 5/1993 | Japan |
| 5182355 | 7/1993 | Japan |

*Primary Examiner*—Thang V. Tran
*Attorney, Agent, or Firm*—Greer, Burns & Crain, Ltd.

[57] ABSTRACT

Disclosed is a seek control method in an optical storage device, of seek-moving a light beam of an optical head from a certain track on an optical storage medium to a desired track. This seek control method comprises a step of calculating a target position, a step of detecting a present position from a track error signal indicating a relative position between the light beam and the track, a step of calculating such a feedback control quantity as to zeroize an error between the target position and the present position and a step of controlling a moving mechanism for moving the light beam in accordance with the feedback control quantity. The present position detecting step includes a first present position detecting step of detecting the present position from a signal into which the track error signal is A/D-converted when a velocity of the light beam is low and a second present position detecting step of detecting the present position from a count value obtained by counting track zero-cross signals acquired by slicing the track error signal at a zero level when the velocity of the light beam is high.

9 Claims, 29 Drawing Sheets

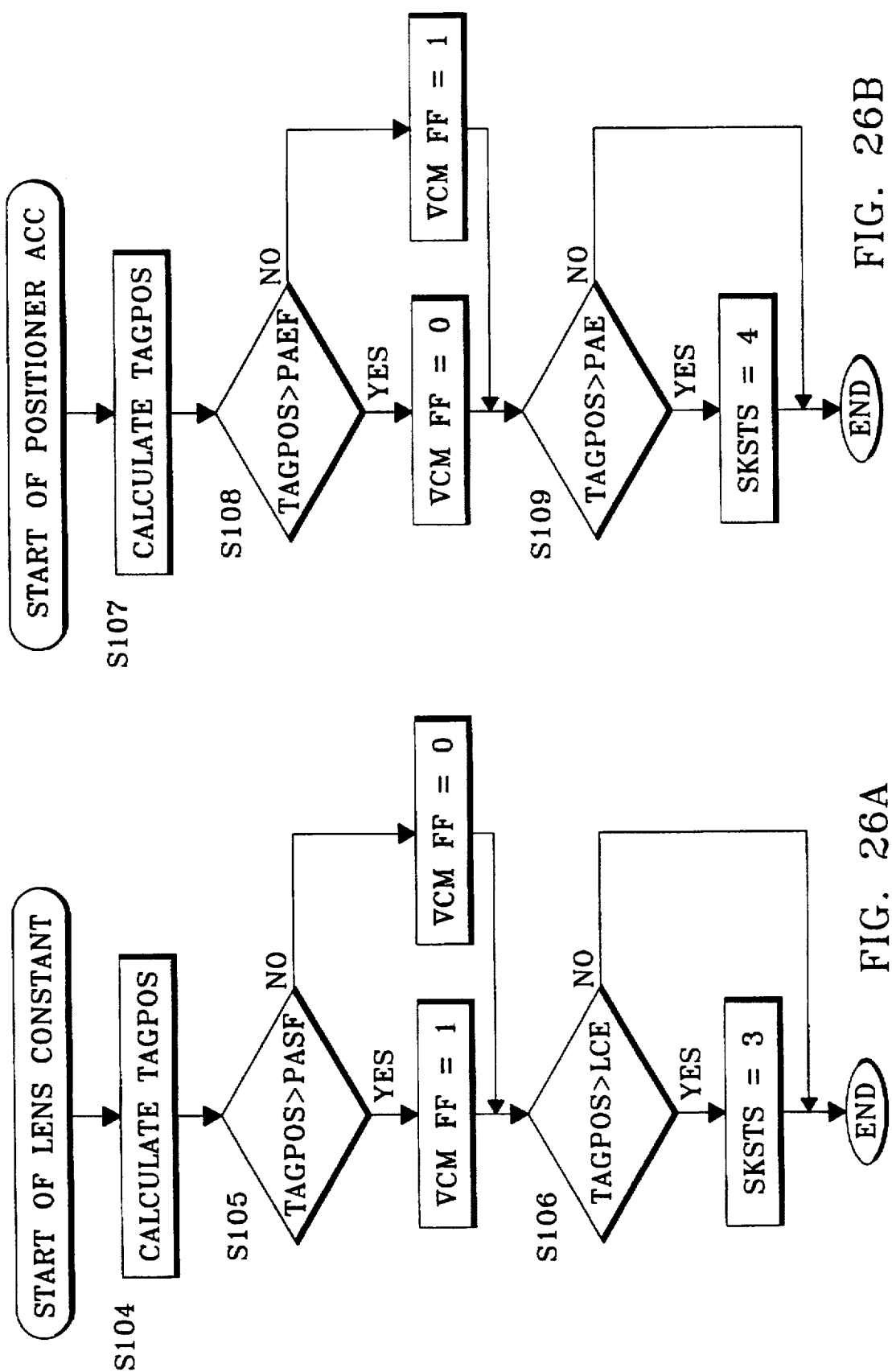

SEEK CONTROL METHOD IN OPTICAL STORAGE DEVICE

BACKGROUND OF THE INVENTION

1. Field of the Invention

The present invention relates generally to a seek control method in an optical storage device, of seek-moving a light beam to a target track on an optical storage medium and, more particularly, to a seek control method in an optical storage device using a digital signal processor.

2. Description of the Related Art

An optical storage device such as an optical disk device, an optical card device, etc. has been widely utilized as a storage device. In this kind of optical storage device, an optical storage medium is irradiated with light beams, and data are thus written to and read from the optical storage medium.

In this optical storage device, a so-called seek operation of moving the light beam to a desired track is conducted. In this seek operation, a track error signal is generated by the light beam reflected from the optical storage medium in order to detect a position of the light beam. When detecting a present position from such a track error signal, even though digital servo control is carried out, a technology for precisely detecting the present position is desired. Further, a technology for performing the servo control with no delay is also desired.

As a conventional method of detecting the present position from a track error signal TES, there has been known a method of detecting the present position from an analog value of the track error signal.

Further, according to another known method, a track zero-cross signal TZC is obtained by slicing the track error signal at a zero level, and the present position is detected by counting those track zero-cross signals.

However, a frequency of the track error signal TES during the seek is as high as 500 kHz at a maximum velocity. For this reason, it may happen that a one-sample process extends 10 or more tracks at a sampling frequency of 50 kHz–40 kHz of the digital servo. Further, the track error signal TES during the seek has a smaller amplitude with an increase in moving velocity.

Therefore, according to the method of detecting the present position from the analog value of the track error signal, if a seek velocity is high, there arises a problem it is difficult to detect the present position with an accuracy on the order of one or less track.

Moreover, according to a method of calculating the present position from the zero-cross signal, if the seek velocity is high, the present position can be stably detected. If the seek velocity is low, however, a problem is that an exact position is hard to detect because of the velocity being unstable.

Next, according to a feedforward control method, feedforward quantities in accelerating and decelerating directions are applied to an acceleration period and a deceleration period as well. In a sample servo control system using a processor for a servo control circuit, the present position is detected from the track error signal at each sample timing. Then, after calculating a target position at that sample timing, a target velocity and a real velocity are to be calculated.

Then, an error quantity between the target velocity and the real velocity is calculated. Furthermore, there is decided whether or not the detected present position is at a predetermined start-of-acceleration point or start-of-deceleration point. Then, if at the predetermined start-of-point, the feedforward quantity in the acceleration or deceleration direction is generated. This feedforward quantity is added to the above error quantity, thus obtaining a control quantity. Based on this control quantity, a motor for an optical head moving mechanism is driven.

The motor for this head moving mechanism actualizes a high-velocity seek and therefore requires a large torque. For this reason, a coil of the motor has a large inductance component. Consequently, an actual current of the motor is late to start flowing. Therefore, the real velocity has a time-lag deviating from a target velocity curve.

Further, in the above-mentioned sample servo system, the time-lag is produced in the target velocity curve during a period from a timing of giving a start-of-acceleration indication or a start-of-deceleration indication to a time when the feedforward quantity is outputted.

Hence, at the time when feedforward quantity is outputted, the control is performed to compensate a delay of an actual start of the deceleration, resulting in an increased error quantity. That is, an overshoot quantity augments. The servo system is thereby made unstable. Therefore, according to the prior art, it is difficult to locate the light beam to the target track.

Further, the same problems may also arise during the acceleration. Therefore, the control is effected to compensate a delay of an actual start of the acceleration, and hence the error quantity augments, resulting in an increased overshoot quantity. Hence, according to the prior art, constant velocity control is hard to perform.

Moreover, if the above-mentioned overshoot quantity increases, noises of a motor also become louder.

SUMMARY OF THE INVENTION

It is a primary object of the present invention to provide a seek control method in an optical storage device, of accurately detecting a present position during a seek.

It is another object of the present invention to provide a seek control method in an optical storage device, of detecting an optimum present position in accordance with a velocity during the seek.

It is still another object of the present invention to provide a seek control method in an optical storage device, of performing a stable seek operation by reducing an overshoot quantity when applying a feedforward.

It is a further object of the present invention to provide a seek control method in an optical storage device, of preventing a servo system from being unstable by applying the feedforward quantity.

To accomplish the above objects, according to a first aspect of the present invention, there is provided a seek control method in an optical storage device, of seek-moving a light beam of an optical head from a certain track on an optical storage medium to a desired track. The seek control method comprises a step of calculating a target position and a step of detecting a present position from a track error signal indicating a relative position between the light beam and the track. The seek control method also comprises a step of calculating such a feedback control quantity as to zeroize an error between the target position and the present position and a step of a controlling moving mechanism for moving the light beam in accordance with the feedback control quantity. Then, the present position detecting step includes a first present position detecting step of detecting the present position from a signal into which the track error signal is D/A-converted when a velocity of the light beam is low and a second present position detecting step of detecting the present position from a count value obtained by counting track zero-cross signals acquired by slicing the track error signal at a zero level when the velocity of the light beam is high.

According to the first aspect of the present invention, when the velocity of the light beam is low, the present position is detected from an analog value of a track error signal TES. When the velocity of the light beam is low, the track error signal TES has a sufficiently large amplitude, and hence, the accurate present position can be detected from the analog value of the track error signal TES.

While on the other hand, when the velocity of the light beam is high, the present position is detected from a count value of track zero-cross signals obtained from the track error signal. When the velocity of the light beam is high, the track error signal TES has a small amplitude. Therefore, the present position is detected from the count value, whereby the accurate present position can be detected.

With this operation, since a method of detecting the present position changes corresponding to the velocity during the seek, the accurate present position can be detected during the seek, and the stable positional control can be thereby attained.

Furthermore, to accomplish the above objects, according to a second aspect of the present invention, there is provided a seek control method in an optical storage device, of seek-moving a light beam of an optical head from a certain track on an optical storage medium to a desired track. The seek control method comprises a step of generating a target velocity along a target velocity curve to reach the desired track from a certain track and a step of detecting a real velocity of the optical head from a track error signal of the optical head. The seek control method further comprises a step of calculating an error value between the target velocity and the real velocity, a step of generating a feedforward value before a change in acceleration of the target velocity in the target velocity curve occurs, a step of calculating a control value by adding the feedforward value to the error value and a step of driving a moving mechanism for moving the optical head in accordance with the control value.

According to the second aspect of the present invention, the feedforward value is generated before the change in the acceleration of the target velocity in the target velocity is caused. It is therefore possible to reduce the error quantity when applying the feedforward. Accordingly, it is feasible to prevent an occurrence of the overshoot of the error quantity and perform the stable high-velocity seek.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 26A is a flowchart of the target position calculation process at the lens constant velocity in the modified embodiment of FIG. 25; FIG. 26B is a flowchart of the target position calculation process at the positioner acceleration in the modified embodiment of FIG. 25;

DETAILED DESCRIPTION OF THE PREFERRED EMBODIMENTS

Figure 1:
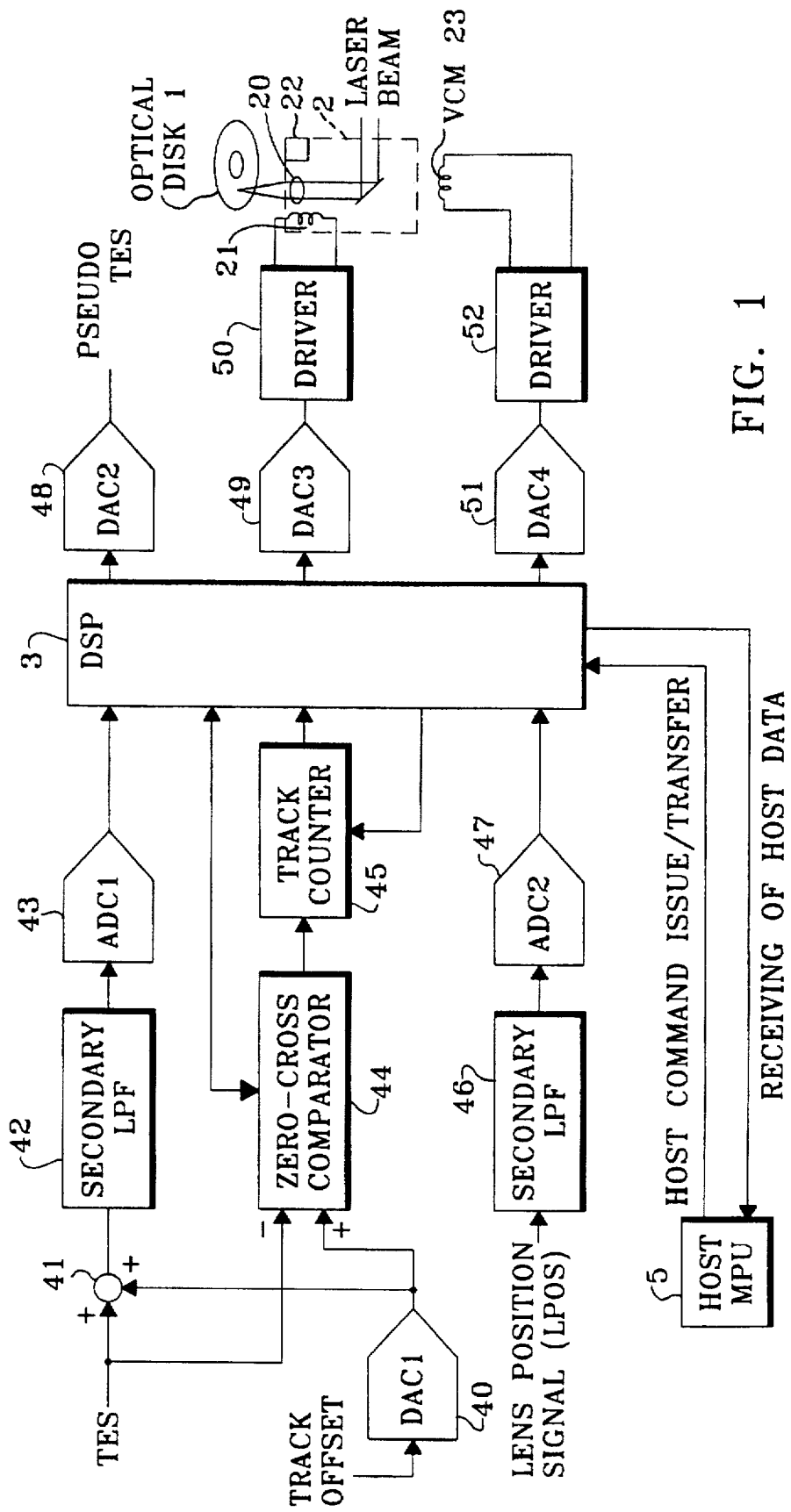
FIG. 1 is a block diagram showing one embodiment of the present invention.
Figure 2:
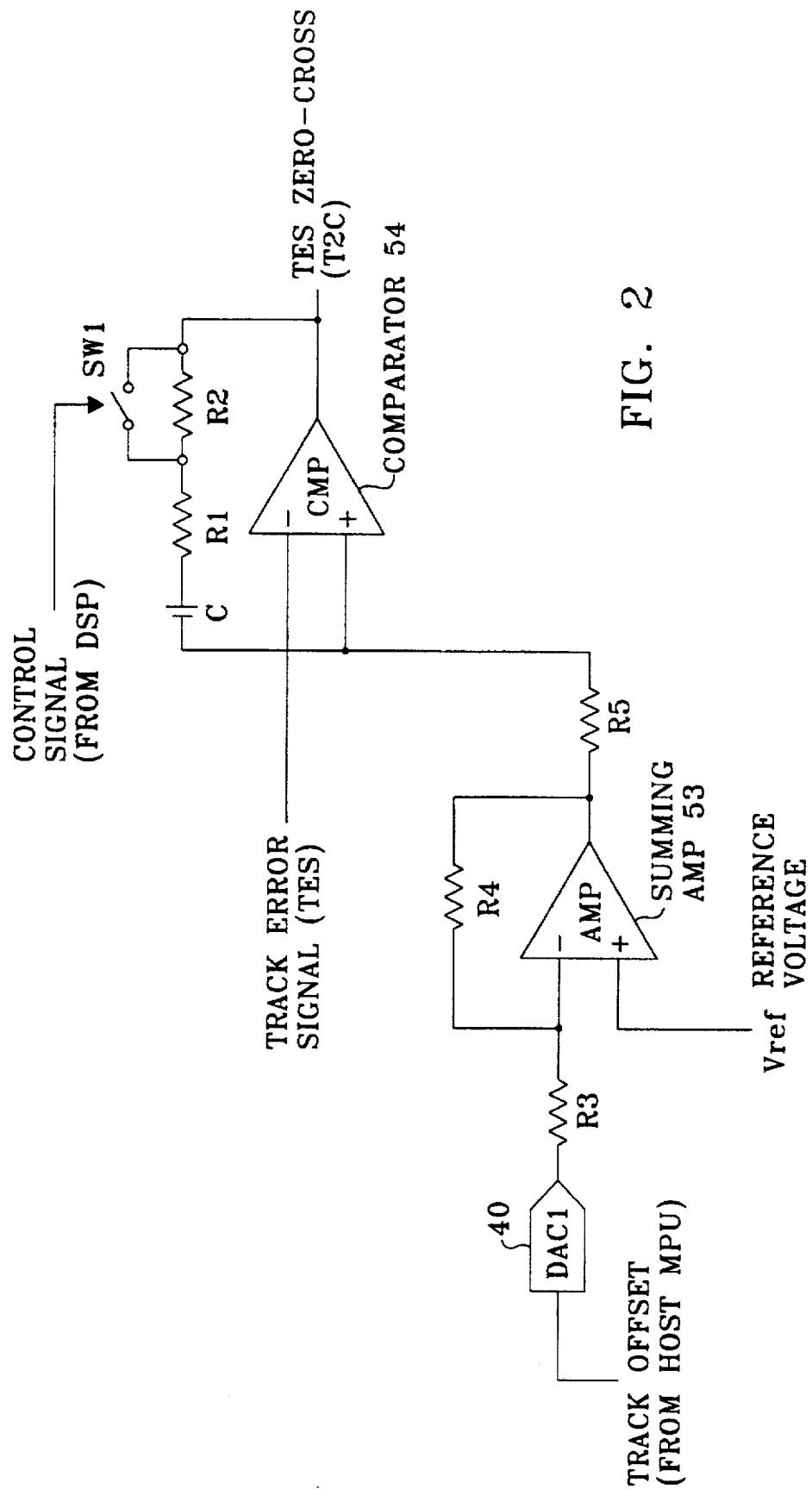
FIG. 2 is a diagram illustrating a circuit of a zero-cross comparator based on a construction of FIG. 1.
Figure 3:
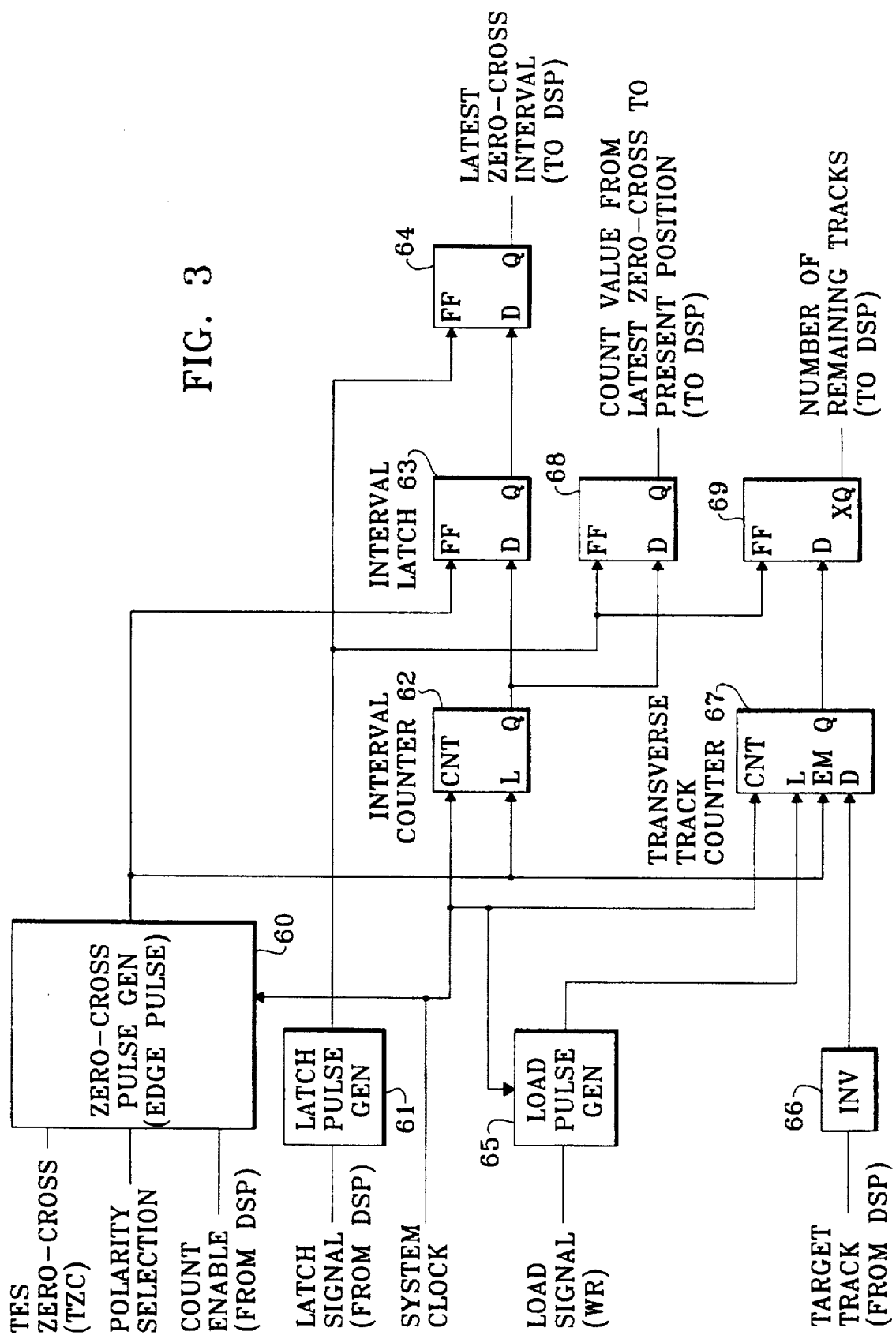
FIG. 3 is a diagram illustrating a track counter circuit based on the construction of FIG. 1.

FIG. 1 is a block diagram illustrating one embodiment of the present invention. FIG. 2 is a circuit diagram of a zero-cross comparator having a construction of FIG. 1. FIG. 3 is a circuit diagram of a track counter circuit having a construction of FIG. 2. Referring to FIG. 1, there is omitted a servo construction of a focus system that is not related to a track access.

An optical disk 1 is irradiated with laser beams from an optical head (referred to as a positioner) 2. Data are thereby read and written. The optical head 2 includes an objective lens 20 for irradiating the disk 1 with the laser beams and a track actuator 21 for moving the objective lens 20 in directions across the tracks on the optical disk 1. The optical head 2 also includes a lens position detector 22 for detecting a position of the objective lens 20.

A VCM (voice coil motor) 23 moves the optical head 2 in the directions across the tracks on the optical disk 1.

A DSP (digital signal processor) 3 performs processing with a sample timer interrupt on the order of 40 kHz–50 kHz. Then, the DSP 3 samples a track error signal TES during an on-track state and obtains a position error from a track center, thereby producing a control quantity. Similarly, during a seek process, as will hereinafter be explained with reference to FIG. 4A and subsequent drawings, a control quantity is produced based on the track error signal TES.

A host MPU (microprocessor) 5 issues a host command such as a seek command, etc. to the DSP 3 and transfers host data about a seek difference, etc.

A first digital/analog converter 40 converts a track offset value given from the host MPU 5 into an analog quantity. An adder 41 adds an output (track offset quantity) of the first D/A converter 40 to the track error signal TES.

A secondary low-pass filter 42 is an analog low-pass filter for cutting off a high-frequency component of the track error signal TES. A cut-off frequency thereof is set at 20 kHz. The first analog/digital converter 43 converts the analog track error signal TES from the low-pass filter 42 into a digital value.

Note that the track error signal TES is a known signal obtained from an unillustrated divided-by-4 detector of the optical head 2. This track error signal TES is a signal taking a one-period sine wave for every track traverse.

A zero-cross comparator (zero-cross circuit) 44, as illustrated in FIG. 2, generates a track zero-cross signal TZC by slicing the track error signal TES with a reference voltage.

A track counter circuit 45, as shown in FIG. 3, detects a position of a light beam from the track zero-cross signal TZC.

A secondary low-pass filter 46 is an analog low-pass filter for cutting off a high-frequency component of a lens position signal LPOS transmitted from the lens position detector 22. A second analog/digital converter 47 converts the analog lens position signal LPOS from the low-pass filter 46 into a digital value.

A second digital/analog converter 48 converts a pseudo track error signal from the DSP 3 into an analog quantity.

This pseudo track error signal is a signal obtained by the DSP 3 adding a predetermined gain to the track error signal inputted from the first A/D converter 43. The track offset value is controlled by monitoring this pseudo track error signal so that the value shows a symmetry between the upper and lower halves.

A third digital/analog converter 49 converts an actuator control value given from the DSP 3 into an analog quantity. A drive circuit 50 drives the actuator 21 by an output of the third D/A converter 49.

A fourth digital/analog converter 51 converts a VCM control value from the DSP 3 into an analog quantity. A drive circuit 52 drives the motor VCM 23 by an output of the fourth D/A converter 51.

Next, the zero-cross comparator 44 will be explained with reference to FIG. 2. As illustrated in FIG. 2, a summing amplifier 53 subtracts, from the reference voltage, the track offset quantity given from the first D/A converter 40. The track error signal TES is a signal centered on the reference voltage Vref but contains a DC component of the circuit offset. etc. Therefore, the DC component is compensated by a pre-measured track offset value. It is to be noted that R3, R4 and R5 are resistances.

A comparator 54 compares the track error signal TES with the compensated reference voltage from the summing amplifier 53 and outputs a track zero-cross signal TZC. The digital voltage after being sliced is positive-fed back to this comparator 54 via the resistances R, R1 and a capacitor C.

A hysteresis characteristic is thereby given to the comparator 54 and thus made insensitive to noises. The noises such as noises of a beard configuration by ID of the track, etc. contained in the track error signals TES are thereby eliminated.

A feedback quantity thereof is set variable by turning ON/OFF a switch SW1 provided on a positive feedback route. When a velocity of the light beams is comparatively slow, the switch SW1 is turned ON to increase the feedback quantity. A malfunction due to the noises is thereby prevented.

On the other hand, when a velocity at which an amplitude of the track error signal TES decreases is comparatively high, the switch SW1 is turned OFF to reduce the feedback quantity. The control thereof is carried out so that the zero-cross of the track error signal TES can be surely detected.

The control of the switch SW1 is performed from the DSP 3. The DSP 3 turns OFF the switch SW1 when the velocity is over a fiducial velocity on the basis of a velocity detection which will be mentioned later.

Next, the track counter circuit 45 will be explained referring to FIG. 3. As illustrated in FIG. 3, a zero-cross pulse generation circuit 60 generates edge pulses by synchronizing the track zero-cross signal TZC with a system clock.

A latch pulse generation circuit 61 generates a latch pulse from a latch signal. An interval counter 62 measures an interval of the edge pulses (track zero-cross signal TZC) by counting the system clocks.

An interval latch circuit 63 latches an output of the interval counter 62 in accordance with the edge pulses. A data holding latch circuit 64 holds data of the latch circuit 63 by use of the latch pulses. An output of this latch circuit 64 indicates a latest zero-cross interval value A. Then, and output of the latch circuit 64 is outputted to the DSP 3.

A load pulse generation circuit 65 generates a load pulse in accordance with a load (write) signal from the DSP 3. An inverter 66 inverts a target number of tracks, which is given from the DSP 3. Loaded into a traverse track counter 67 is an inversion signal (target-number-of-tracks' complement) of the target number of tracks in accordance with the load pulse. Then, the traverse track counter 67 counts the edge pulses from a load value thereof.

Data holding latch circuit 68 latches a count value of the interval counter 62 in accordance with the latch pulse. An output of this latch circuit 68 indicates a count value B from the latest zero-cross to a present time (when the latch pulse is generated). An output of this latch circuit 68 is outputted to the DSP 3.

A data holding latch circuit 69 latches a count value of the traverse track counter 67 in accordance with the latch pulse. An output of this latch circuit 69 represents a number-of-remaining-tracks Xr. An output of this latch circuit 69 is outputted to the DSP 3.

Figure 4A:
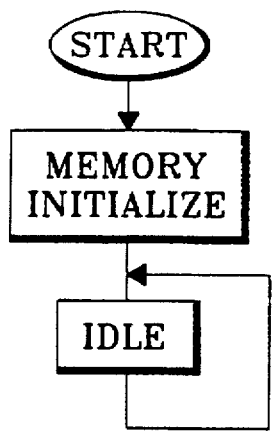
FIGS. 4A, 4B and 4C are diagrams each showing firmware of a DSP based on the construction of FIG. 1.
Figure 4B:
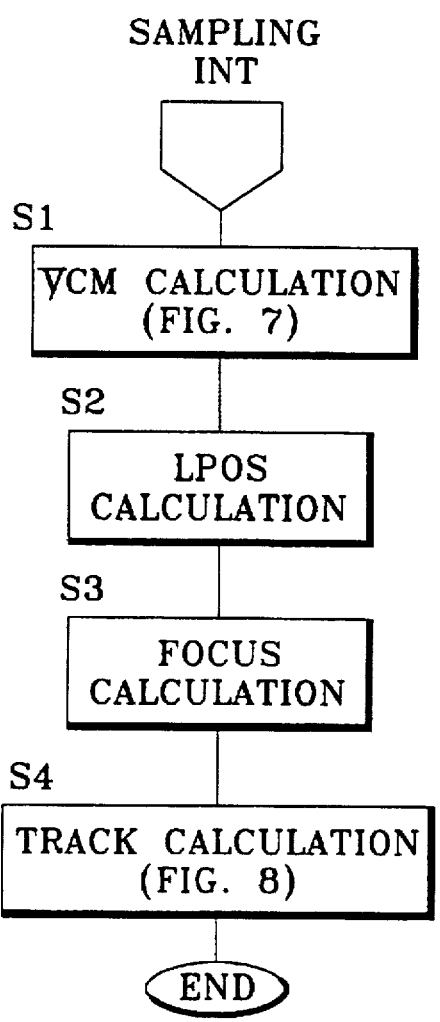
Figure 4C:
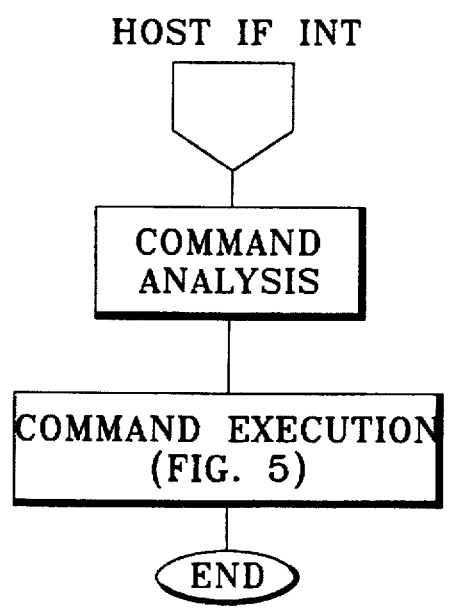
Figure 5:
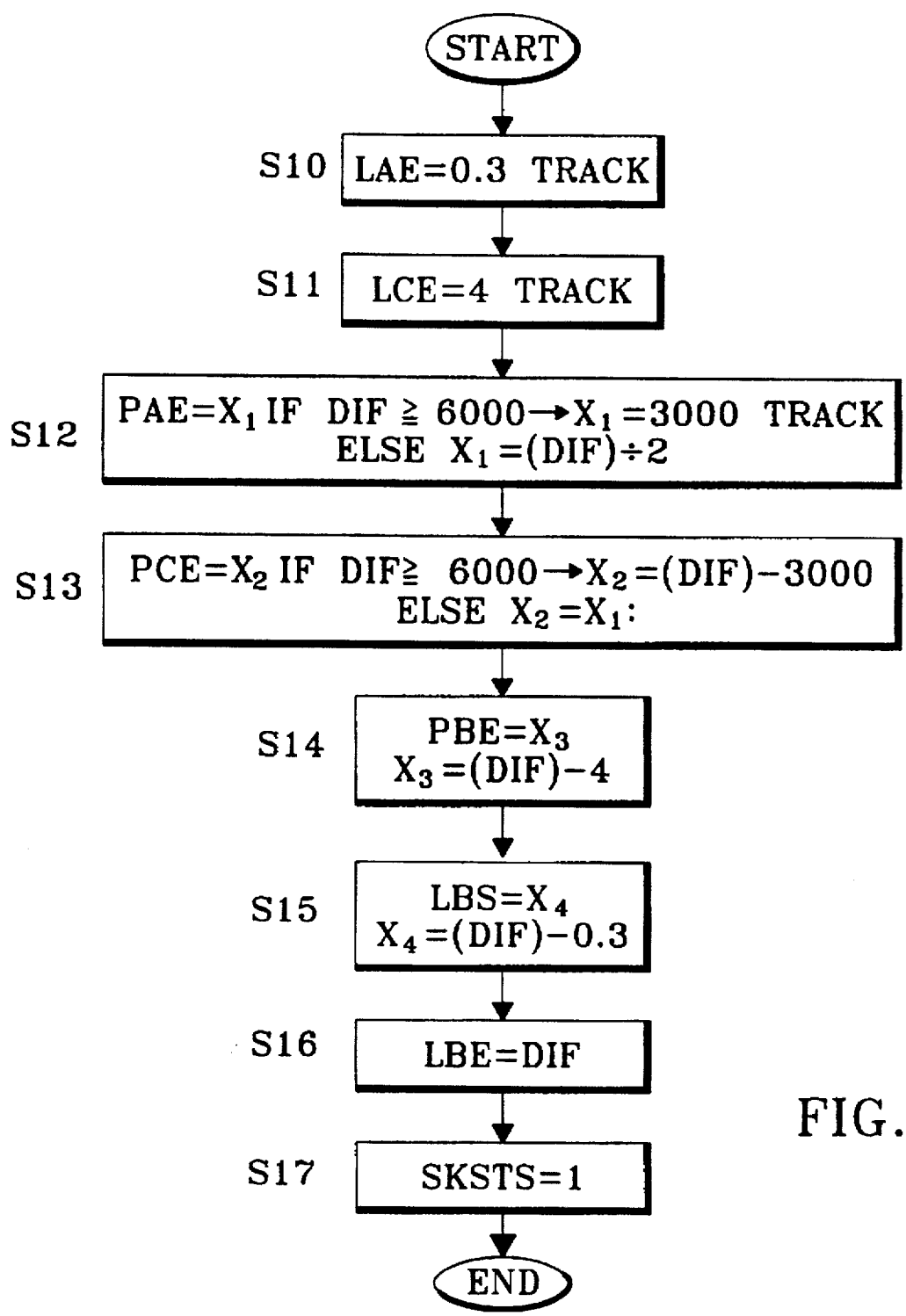
FIG. 5 is a flowchart of a seek command process in FIG. 4C.
Figure 6:
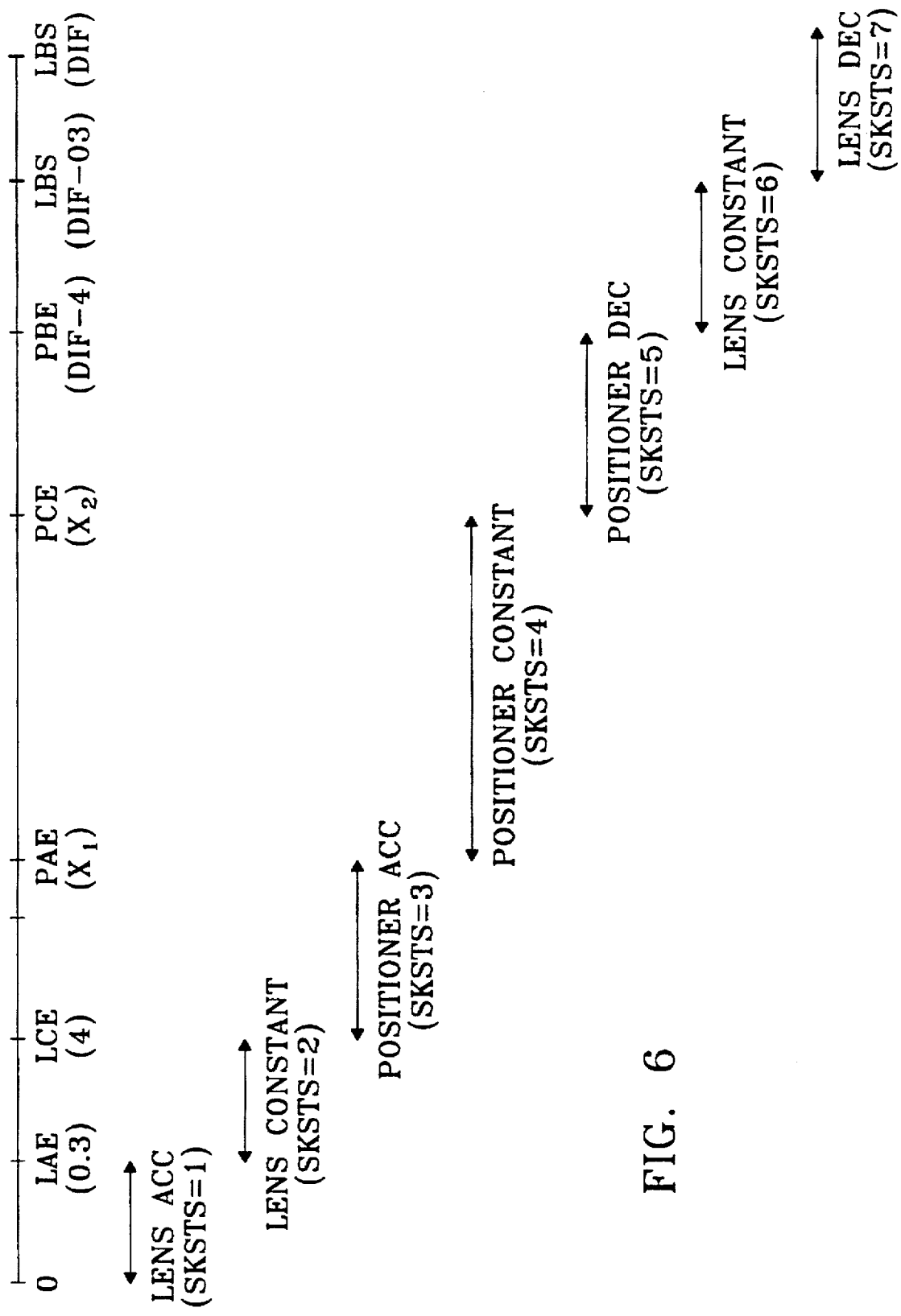
FIG. 6 is an explanatory diagram of a seek process of FIG. 5.

FIGS. 4A, 4B and 4C are diagrams each illustrating firmware of the DSP 3. FIG. 5 is a seek command processing flowchart in FIG. 4C. FIG. 6 is an explanatory diagram of the seek process.

As shown in FIG. 4A, the DSP 3 initializes the storage and comes into an idle status. In the idle status, if there is an interrupt, an interrupt process is executed.

If there is a sampling interrupt, a sampling interrupt process shown in FIG. 4B is executed. This sampling interrupt process will be described.

(S1) To start with, the DSP 3 executes a VCM calculation process of calculating a control quantity of the VCM which will be hereinbelow stated with reference to FIG. 7.

(S2) Next, the DSP 3 executes an LPOS calculation process of calculating a control quantity of a lens position. For instance, when lens is locked, a lens position signal LPOS from the second A/D converter 47 is sampled, and a relative position between the optical head 2 and the lens is obtained. Calculated subsequently is such a control quantity as to zeroize a position error obtained from the lens position signal LPOS. Based on this control quantity, the track actuator 21 is controlled through the D/A converter 49 and the drive circuit 50 as well. With this process, the optical head 2 is controlled so that the lens 20 is positioned at the center.

(S3) Next, the DSP 3 carries out a focus calculation process of calculating a control quantity of a focus position.

(S4) Further, the DSP 3 executes a track calculation process of calculating a control quantity of the track actuator, which will hereinafter be explained with reference to FIG. 8. Then, the processing comes to an end.

Next, if there is an interrupt from the host MPU 5, a host interface interrupt process shown in FIG. 4C is carried out. In this interrupt process, a command is analyzed and then executed.

In this command execution, a seek command process will be explained referring to FIG. 5.

(S10) The DSP 3, upon receiving the seek command, a seek difference and a seek direction, sets an end-of-acceleration track position LAE of the lens. The position LAE is predetermined on a [0.3] track.

(S11) Subsequently, the DSP 3 sets an end-of-constant-velocity track position LCE of the lens. The position LCE is predetermined on a [4] track.

(S12) The DSP 3 sets an end-of-acceleration track position PAE of a positioner 2 to X1. This value X1 is, if a difference DIF is over 6000 tracks, set to [3000] tracks. On the other hand, if the difference DIF does not exceed 6000 tracks, there is set such as [DIF]+2.

(S13) Next, the DSP 3 sets an end-of-constant-velocity track position PCE of the positioner 2 to X2. This value X2 is, if the difference DIF is over 6000 tracks, set on ([DIF] −3000) tracks. Whereas if the difference DIF does not exceed 6000 tracks, X1 is set.

(S14) The DSP 3 sets an end-of-deceleration track position PBE of the positioner 2 to X3. The value X3 is ([DIF]−4) tracks.

(S15) The DSP 3 sets an end-of-constant-velocity track position LBS of the lens to X4. This value X4 is ([DIF]−0.3) tracks.

(S16) The DSP 3 sets an end-of-deceleration track position LBE of the lens to the difference [DIF].

(S17) Finally, the DSP 3 sets a seek status signal SKSTS to [1] (lens acceleration mode), and the processing is finished.

A seek processing mode to a target track is determined by this seek command process. As illustrated in FIG. 6, a lens acceleration period extends from a track [0] to a track LAE (0.3). A seek status signal SKSTS thereof is [1].

A lens constant velocity period extends from a track LAE to a track LCE (4). The seek status signal SKSTS thereof is [2]. A positioner acceleration period extends from the track LCE to a track PAE (=X1). The seek status signal SKSTS thereof is [3].

A positioner constant velocity period extends from a track PAE to a track PCE (=X2). The seek status signal SKSTS thereof is [4]. A positioner deceleration period extends from a track PCE to a track PBE (=X3). The seek status signal SKSTS thereof is [5].

A lens constant velocity period extends from a track PBE to a track LBS (=X4). The seek status signal SKSTS thereof is [6]. A lens deceleration period extends from a track LBS to a track LBE. The seek status signal SKSTS thereof is [7]. Note that when the seek status signal SKSTS is [0], this indicates a fine control mode during the on-track status.

These seek status signals SKSTS are stored in a register. Thus, each of the acceleration period, the constant velocity period and the deceleration period is set based on the seek difference.

Figure 7:
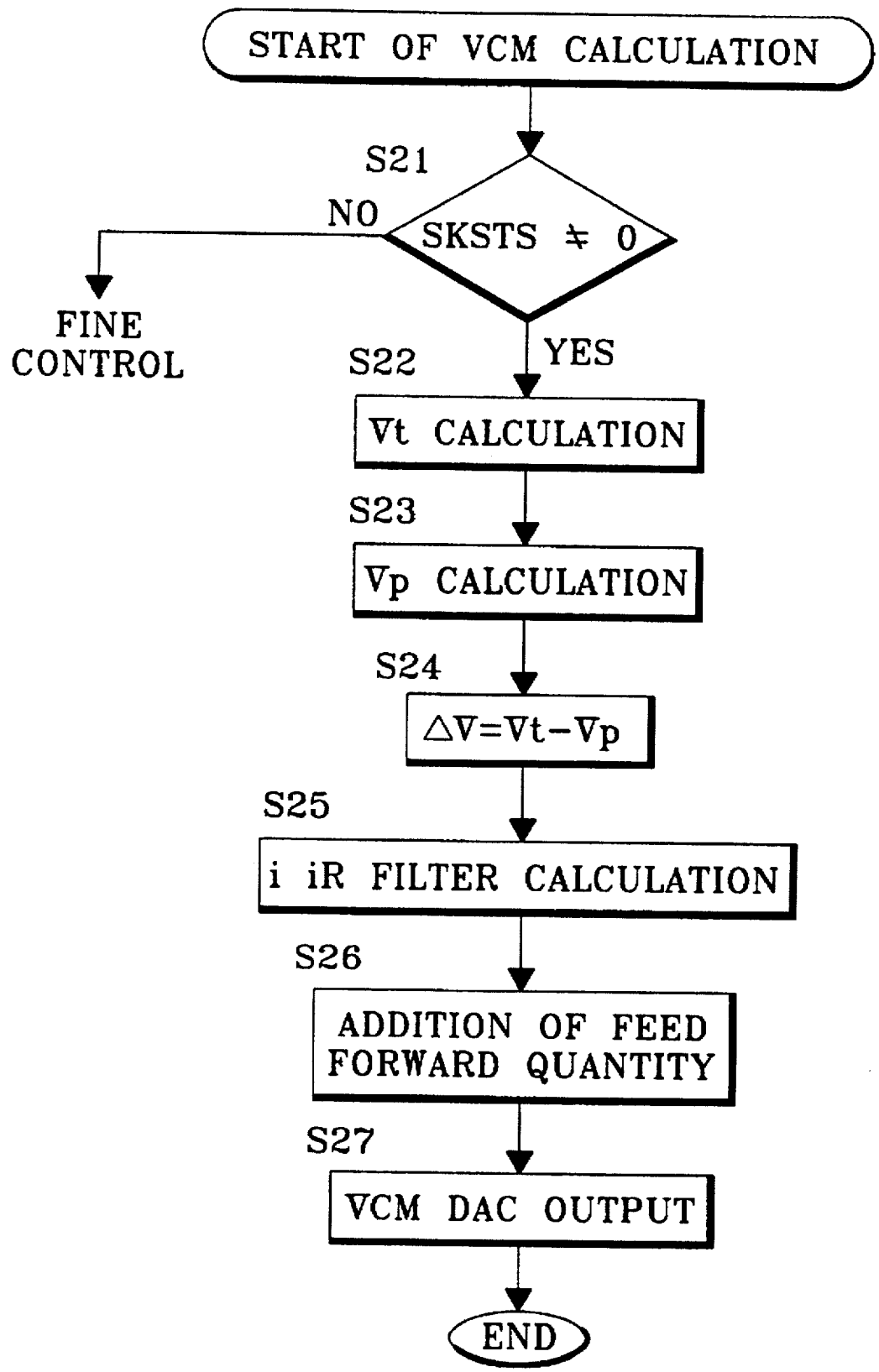
FIG. 7 is a flowchart of a VCM calculation process in FIG. 4B.
Figure 13:
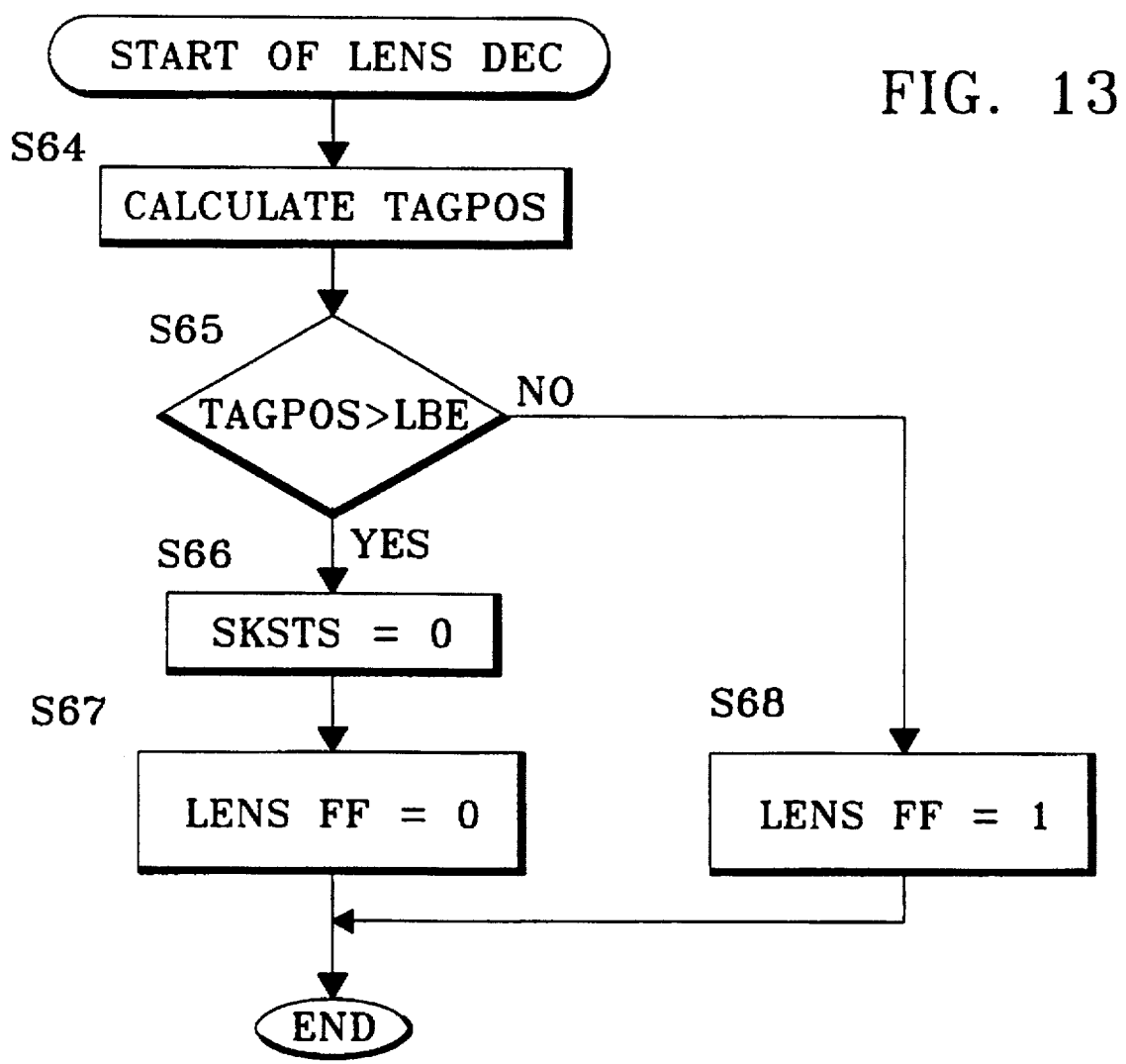
FIG. 13 is a flowchart of the target position calculation process at a lens deceleration in FIG. 8.
Figure 14:
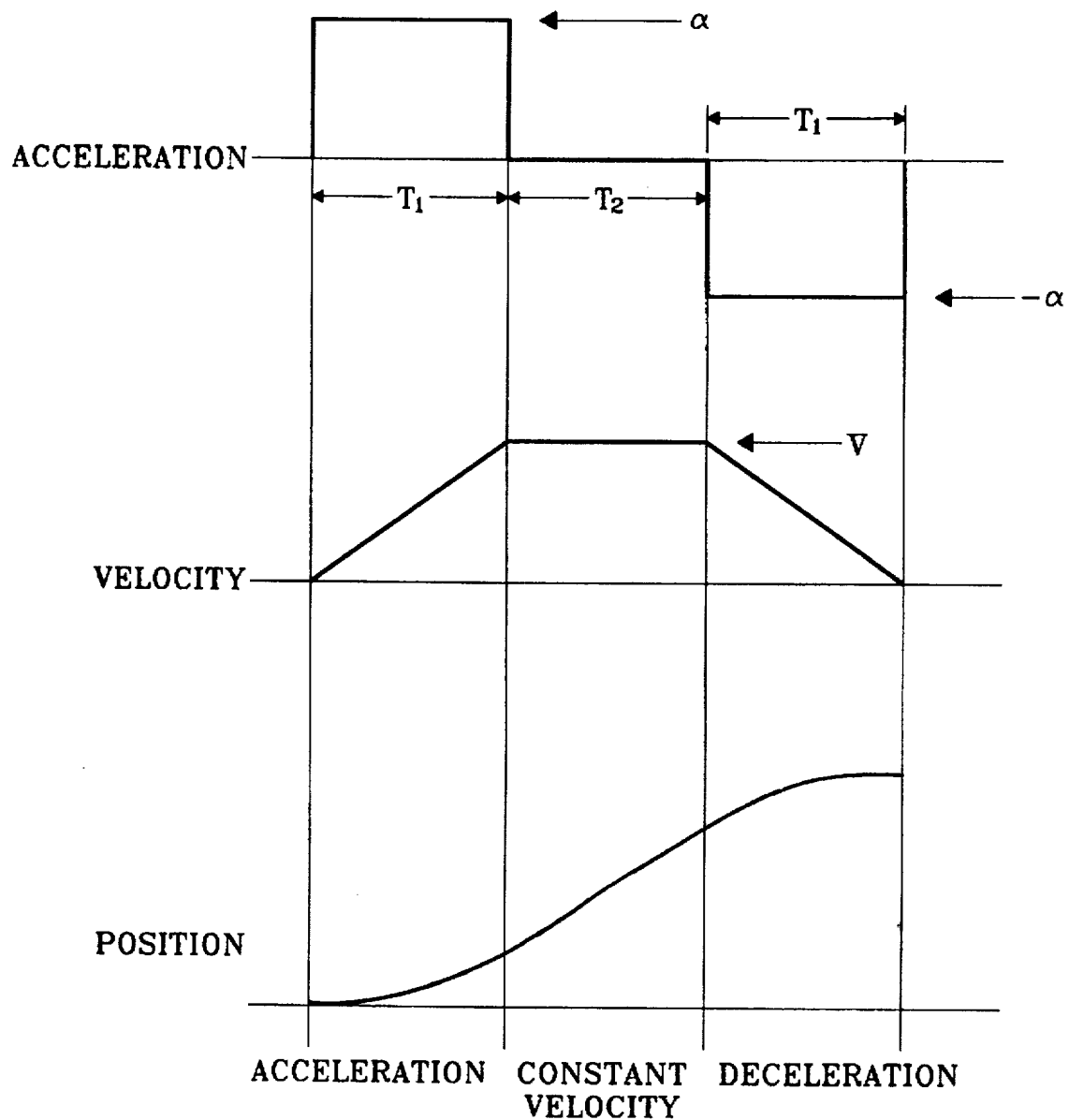
FIG. 14 is an explanatory diagram of the target position calculation process in FIGS. 10A through 13.

FIG. 7 is a flowchart of a VCM calculation process in FIG. 4B. FIG. 8 is a flowchart of a track calculation process in FIG. 4B. FIG. 9 is a flowchart of an SKSTS determination process in FIG. 8. FIGS. 10A through 13 are flowcharts of a target position calculation process in FIG. 8. FIG. 14 is an explanatory diagram of the target position calculation process.

The VCM calculation process will be explained with reference to FIG. 7.

(S21) The DSP 3 checks whether or not the seek status signal SKSTS is [0]. If the seek status signal SKSTS is nothing but [0], that is, if the seek status signal SKSTS is just [0], this implies a fine control status, and hence the fine control is carried out.

Namely, the track error signal TES is sampled from the analog/digital converter 43, and a position error from the track center is to be obtained. Then, there is calculated such a control quantity that this position error is zeroized, and the track actuator 21 is thereby controlled.

(S22) Whereas if the seek status signal SKSTS is a value other than [0], this implies the seek process. Therefore, the DSP 3 calculates a target velocity Vt. The target velocity Vt is given by [Target Position in Sampling Interrupt of Last Time]−[Target Position in Sampling Interrupt of This Time]. These target positions are obtained by the track calculation process in FIG. 8.

(S23) Next, the DSP 3 calculates a present velocity Vp. The present velocity Vp is given by [Present Position in Sampling Interrupt of Last Time]–[Present Position in Sampling Interrupt of This Time]. This present position is obtained by the track calculation process in FIG. 8.

(S24) Next, the DSP 3 calculates a velocity error ΔV from the following formula:

$$\Delta V = Vt - Vp \qquad (1)$$

(S25) Next, the DSP 3 performs a low-pass filter (iiR filter) calculation, thereby obtaining a control quantity.

(S26) Further, the DSP 3 adds, when the VCM feedforward flag is ON ([1]), a feedforward quantity to the obtained control quantity. This feedforward quantity is an acceleration quantity α.

(S27) Finally, the DSP 3 outputs the thus obtained control quantity to the D/A converter (DAC) 51. This leads to an end of the VCM calculation process.

Next, the track calculation process will be explained with reference to FIGS. 8 through 14.

(S30) The DSP 3 decides the seek status signal SKSTS by processing in FIG. 9, which will be stated later. If the seek status signal SKSTS is [0], this implies the fine control status, and hence, as described above, the ON-track control is carried out.

(S31) The DSP 3, if the seek status signal STSTS is not [0], calculates a target position corresponding to each seek status. The calculation of this target position will hereinafter be described with reference to FIGS. 10A through 13.

(S32) Next, the DSP 3 calculates the present position which will be mentioned later with reference to FIG. 15.

(S33) The DSP 3 next calculates the position error. As will hereinafter be explained referring to FIG. 19, a position error POSERR is obtained by a calculation such as [Target Position]–[Present Position].

(S34) Next, the DSP 3 performs a PID (proportional plus integral plus differential) calculation.

(S35) Further, the DSP 3 adds, when the lens feedforward flag is ON ([1]), the feedforward quantity to the obtained control quantity. This feedforward quantity is the acceleration quantity α.

(S36) Finally, the DSP 3 outputs the thus obtained control quantity to the D/A converter (DAC) 49. This leads to an end of the track calculation process.

As illustrated in FIG. 9, the SKSTS deciding process is, as explained in FIG. 6, a process of deciding a seek status in accordance with the seek status signal SKSTS. That is, if the seek status signal SKSTS is [0], this implies a fine control status. If the seek status signal SKSTS is [1], this is a lens acceleration control status.

If the seek status signal SKSTS is [2], this is a lens constant velocity control status. If the seek status signal SKSTS is [3], this is a positioner acceleration control status. If the seek status signal SKSTS is [4], this is a positioner constant velocity control status. If the seek status signal SKSTS is [5], this is a positioner deceleration control status.

If the seek status signal SKSTS is [6], this is the lens constant velocity control status. If the seek status signal SKSTS is [7], this is a lens deceleration control status.

Thus, the seek status is decided, and each of the target position calculation processes in FIGS. 10A through 13 is conducted.

Figure 10A:
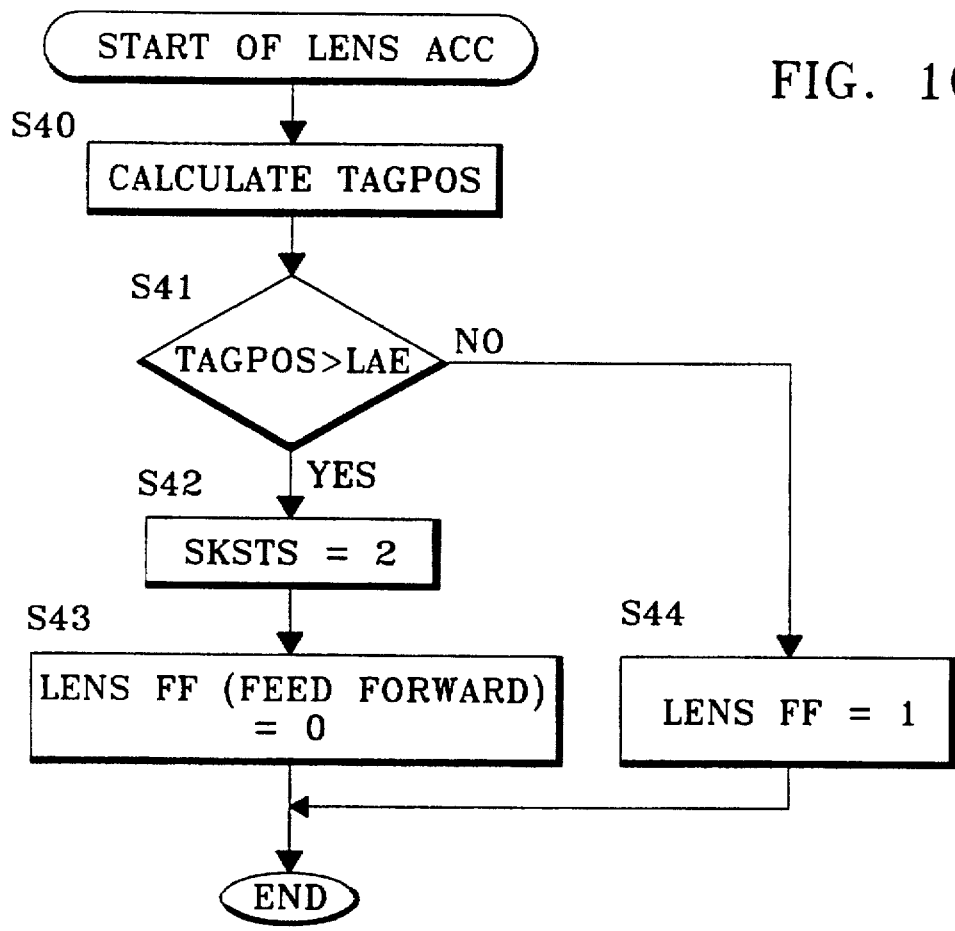
FIG. 10A is a flowchart of a target position calculation process at a lens acceleration in FIG. 8.

The target position calculation process in the lens acceleration status will be explained with reference to FIG. 10A.

(S40) The DSP 3 calculates a target position TAGPOS. As illustrated in FIG. 14, the acceleration and deceleration are carried out by use of a fixed acceleration α. Therefore, a target position x during the acceleration is expressed by the following formula:

$$x = \alpha 1 \cdot t^2 / 2 \qquad (2)$$

where α1 is the acceleration of the lens, and t is the time.

(S41) Next, the DSP 3 checks whether or not the target position TAGPOS exceeds the lens acceleration end track position LAE.

(S42) The DSP 3_if the target position TAGPOS is over the lens acceleration end track position LAE, this indicates that it exceeds the lens acceleration period_therefore changes the seek status signal SKSTS to [2] (lens constant velocity status).

(S43) Then, the DSP 3 sets the lens feedforward flag to [0] (no feedforward addition), and the processing is ended.

(S44) On the other hand, the DSP 3_if the target position TAGPOS does not exceed the lens acceleration end track position LAE, this is still in the lens acceleration period_ therefore sets the lens feedforward flag to [1] (feedforward addition). Then, the processing comes to an end.

Next, the target position calculation process in the lens constant velocity status will be described with reference to FIG. 10B.

(S45) The DSP 3 calculates the target position TAGPOS. As shown in FIG. 14, the constant velocity period is a period for which the acceleration is zero. Hence, the target position x at the constant velocity is given by the following formula:

$$x = \alpha 1 \cdot t^2 / 2 + \alpha 1 (t - t1) \qquad (3)$$

where α1 is the acceleration, t is the time, and t1 is the acceleration end time.

(S46) Next, the DSP 3 checks whether or not the target position TAGPOS exceeds the lens constant velocity end track position LCE. The DSP 3, if the target position TAGPOS is not over the lens constant velocity end track position LCE, finishes the processing.

(S47) The DSP 3_if the target position TAGPOS is over the lens constant velocity end track position LCE, this indicates that it exceeds the lens constant velocity period_ therefore changes the seek status signal SKSTS to [3] (positioner acceleration status). Then, the processing comes to an end.

Next, the target position calculation process in the positioner acceleration status will be explained with reference to FIG. 11A.

(S48) The DSP 3 calculates the target position TAGPOS. As illustrated in FIG. 14, the positioner is accelerated by use of a fixed acceleration α2. Therefore, the target position x during the acceleration is expressed by the following formula:

$$x = \alpha 2 \cdot t(t - t2)^2 / 2 + x2 + v2(t - t2) \qquad (4)$$

where α2 is the acceleration of the positioner, and v2 is the velocity in a lens acceleration end position.

(S49) Next, the DSP 3 checks whether or not the target position TAGPOS exceeds the positioner acceleration end track position PAE.

(S50) The DSP 3_if the target position TAGPOS is over the positioner acceleration end track position PAE, this indicates that it exceeds the positioner acceleration period_ therefore changes the seek status signal SKSTS to [4] (positioner constant velocity status).

(S51) Then, the DSP 3 sets the VCM feedforward flag to [0] (no feedforward addition), and the processing is ended.

(S52) On the other hand, the DSP 3_if the target position TAGPOS does not exceed the positioner acceleration end track position PAE, this is still in the positioner acceleration period_therefore sets the VCM feedforward flag to [1] (feedforward addition). Then, the processing comes to an end.

Next, the target position calculation process in the positioner constant velocity status will be described with reference to FIG. 11B.

(S53) The DSP 3 calculates the target position TAGPOS. As shown in FIG. 14, the constant velocity period is the period for which the acceleration is zero. Hence, the target position x at the constant velocity is given by the following formula:

$$x=x3+v3(t-t3) \tag{5}$$

where t is the time, t3 is the positioner acceleration end time, x3 is the positioner acceleration end position, and v3 is the velocity when the acceleration of the positioner is finished.

(S54) Next, the DSP 3 checks whether or not the target position TAGPOS exceeds the positioner constant velocity end track position PCE. The DSP 3, if the target position TAGPOS is not over the positioner constant velocity end track position PCE, finishes the processing.

(S55) The DSP 3_if the target position TAGPOS is over the positioner constant velocity end track position PCE, this indicates that it exceeds the positioner constant velocity period_therefore changes the seek status signal SKSTS to [5] (positioner deceleration status). Then, the processing comes to an end.

Next, the target position calculation process in the positioner deceleration status will be explained with reference to FIG. 12A.

(S56) The DSP 3 calculates a target position TAGPOS. As illustrated in FIG. 14, the positioner is decelerated by use of a fixed acceleration α2. Therefore, the target position x during the deceleration is given by the following formula:

$$x=-\alpha2 \cdot (t-t4)^2/2+x4+v4(t-t4) \tag{6}$$

where α2 is the acceleration of the positioner, t is the time, t4 is the end time of the positioner acceleration, x4 is the end position of the positioner acceleration, and v4 is the velocity in the end position of the positioner acceleration.

(S57) Next, the DSP 3 checks whether or not the target position TAGPOS exceeds the positioner deceleration end track position PBE.

(S58) The DSP 3_if the target position TAGPOS is over the positioner deceleration end track position PBE, this indicates that it exceeds the positioner deceleration period_ therefore changes the seek status signal SKSTS to [6] (lens constant velocity status).

(S59) Then, the DSP 3 sets the VCM feedforward flag to [0] (no feedforward addition), and the processing is ended.

(S60) On the other hand, the DSP 3_if the target position TAGPOS does not exceed the positioner deceleration end track position PBE, this is still in the positioner deceleration period_therefore sets the VCM feedforward flag to [1] (feedforward addition). Then, the processing is finished.

Next, the target position calculation process in the lens constant velocity status will be described with reference to FIG. 12B.

(S61) The DSP 3 calculates the target position TAGPOS. As shown in FIG. 14, the constant velocity period is the period for which the acceleration is zero. Hence, the target position x at the constant velocity is given by the following formula:

$$x=x5+v5(t-t5) \tag{7}$$

where t is the time, t5 is the deceleration end time of the positioner, x5 is the deceleration end position of the positioner, and v5 is the velocity when the deceleration of the positioner terminates.

(S62) Next, the DSP 3 checks whether or not the target position TAGPOS exceeds the lens constant velocity end track position LBE. The DSP 3, if the target position TAGPOS is not over the lens constant velocity end track position LBE, finishes the processing.

(S63) The DSP 3_if the target position TAGPOS is over the lens constant velocity end track position LBS, this indicates that it exceeds the lens constant velocity period_ therefore changes the seek status signal SKSTS to [7] (lens deceleration status). Then, the processing comes to an end.

Next, the target position calculation process in the lens deceleration status will be explained with reference to FIG. 13.

(S64) The DSP 3 calculates the target position TAGPOS. As illustrated in FIG. 14, the deceleration is effected by use of a fixed deceleration −α1. Therefore, the target position x during the deceleration is expressed by the following formula:

$$x=-\alpha1 \cdot (t-t6)^2/2+x6+v6(t-t6) \tag{8}$$

where α1 is the acceleration of the lens, t is the time, t6 is the end time of the lens constant velocity, x6 is the end position of the lens constant velocity, and v6 is the velocity in the end position of the lens constant velocity.

(S65) Next, the DSP 3 checks whether or not the target position TAGPOS exceeds the lens deceleration end track position LBE.

(S66) The DSP 3_if the target position TAGPOS is over the lens deceleration end track position LBE, this indicates that it exceeds the lens deceleration period_therefore changes the seek status signal SKSTS to [0] (fine control status).

(S67) Then, the DSP 3 sets the VCM feedforward flag to [0] (no feedforward addition), and the processing is ended.

(S68) On the other hand, the DSP 3_if the target position TAGPOS does not exceed the lens deceleration end track position LBE, this is still in the lens deceleration period_ therefore sets the VCM feedforward flag to [1] (feedforward addition). Then, the processing comes to an end.

Thus,the target position in each seek status is calculated.

Next, a present position calculating step in FIG. 8 will be explained.

Figure 8:
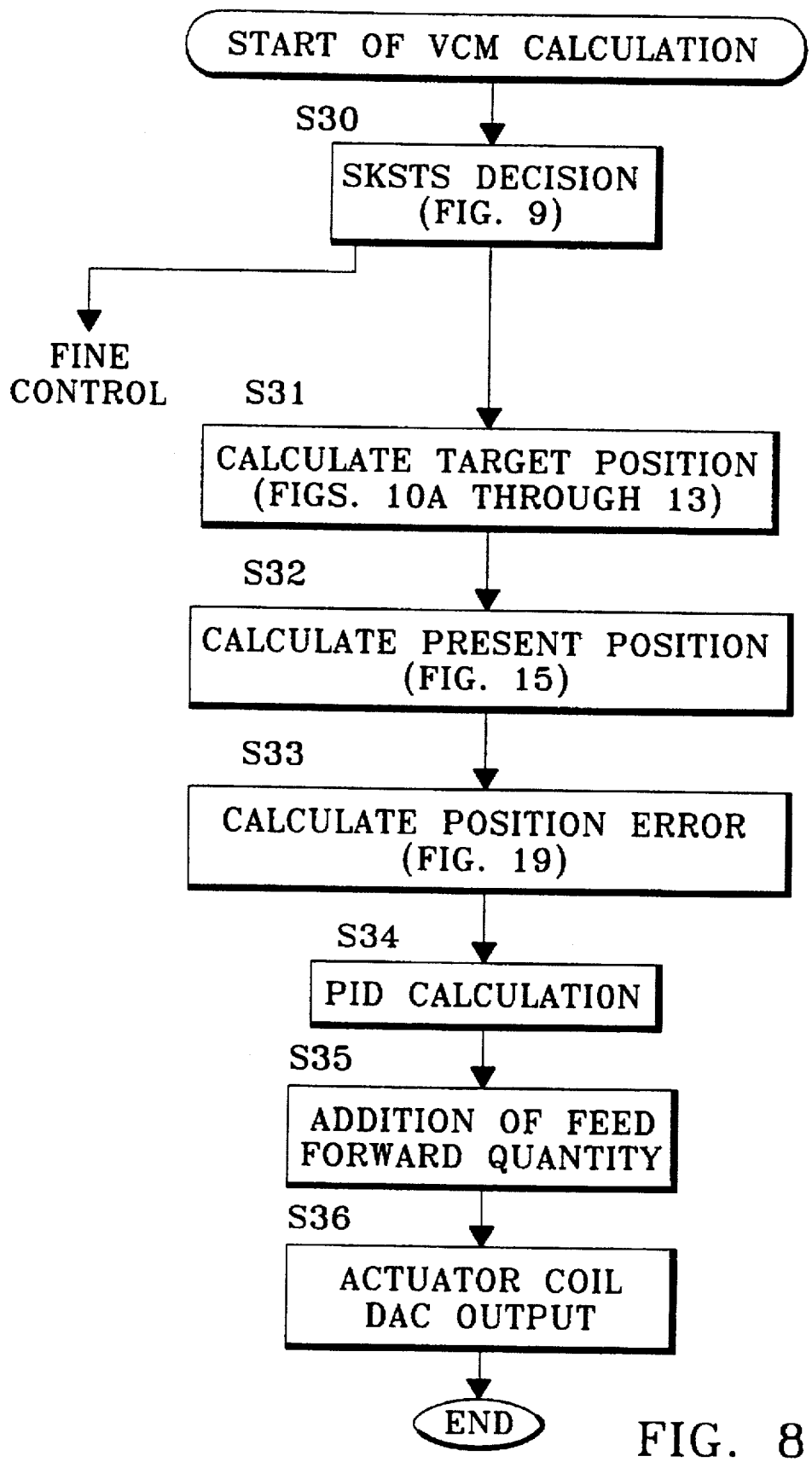
FIG. 8 is a flowchart of a track calculation process in FIG. 4B.
Figure 9:
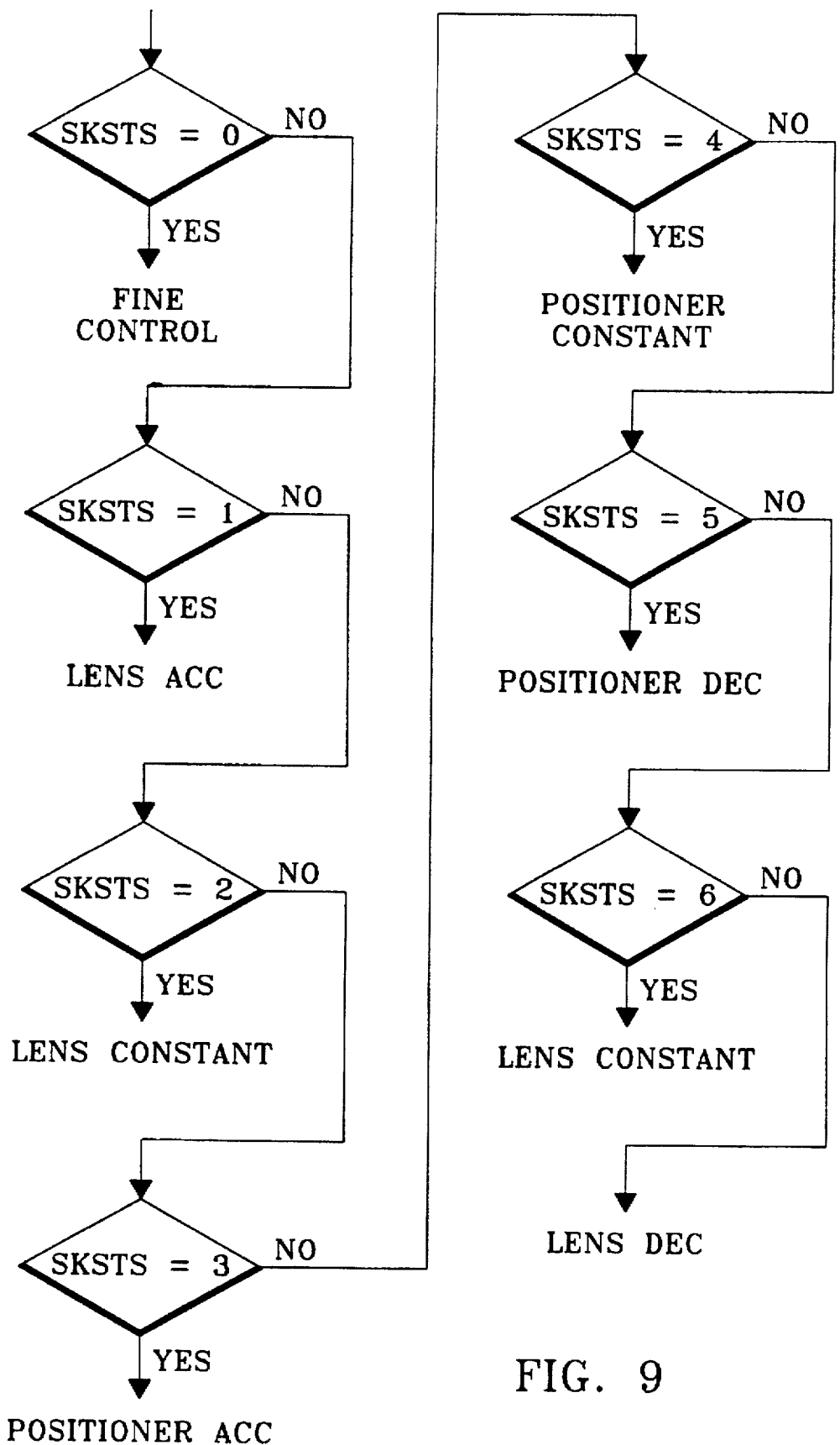
FIG. 9 is a flowchart of an SKSTS deciding process in FIG. 8.
Figure 15:
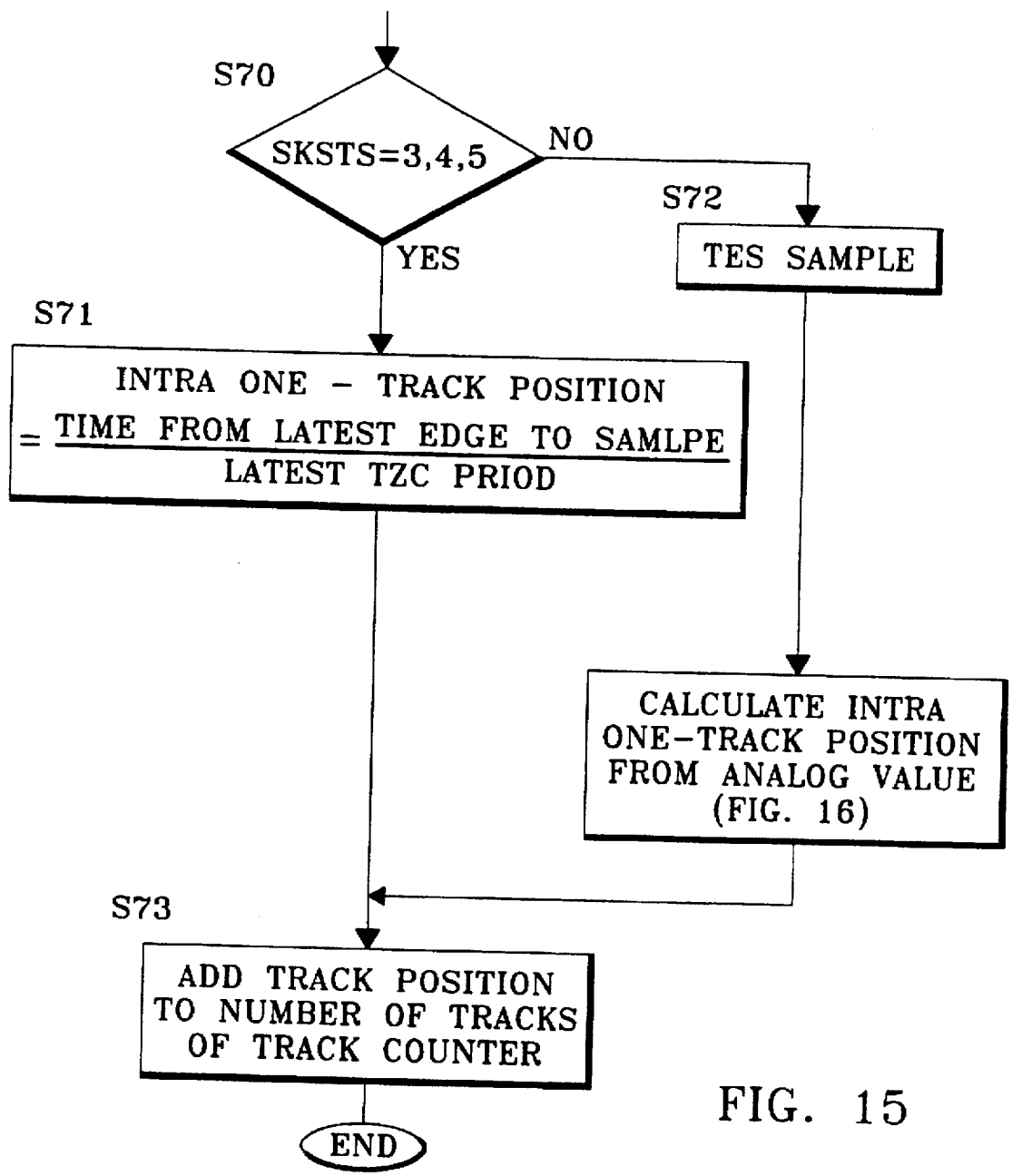
FIG. 15 is a flowchart of a present position calculation process in FIG. 8.
Figure 16:
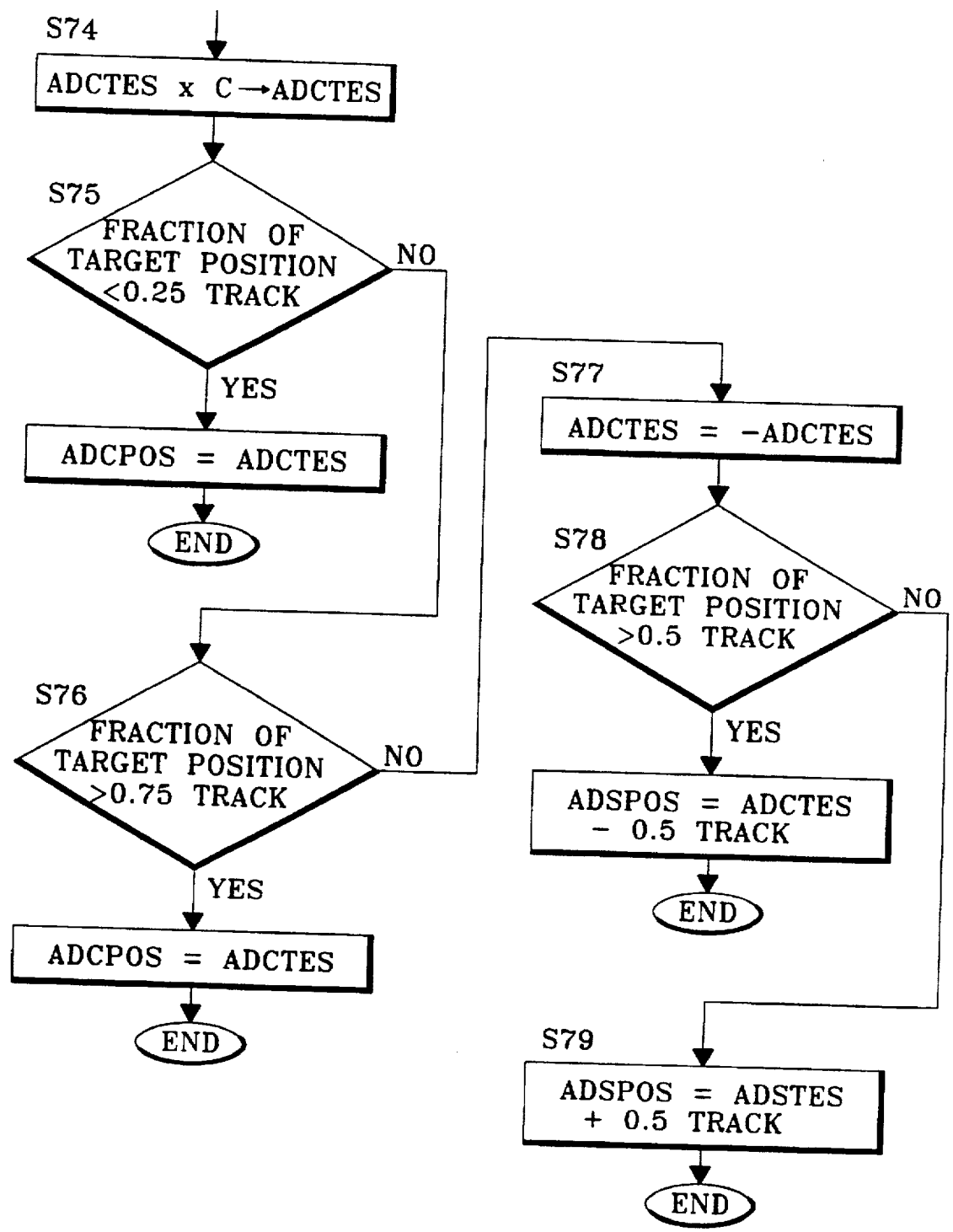
FIG. 16 is a flowchart showing a process of the calculation from an analog value in FIG. 15.
Figure 17:
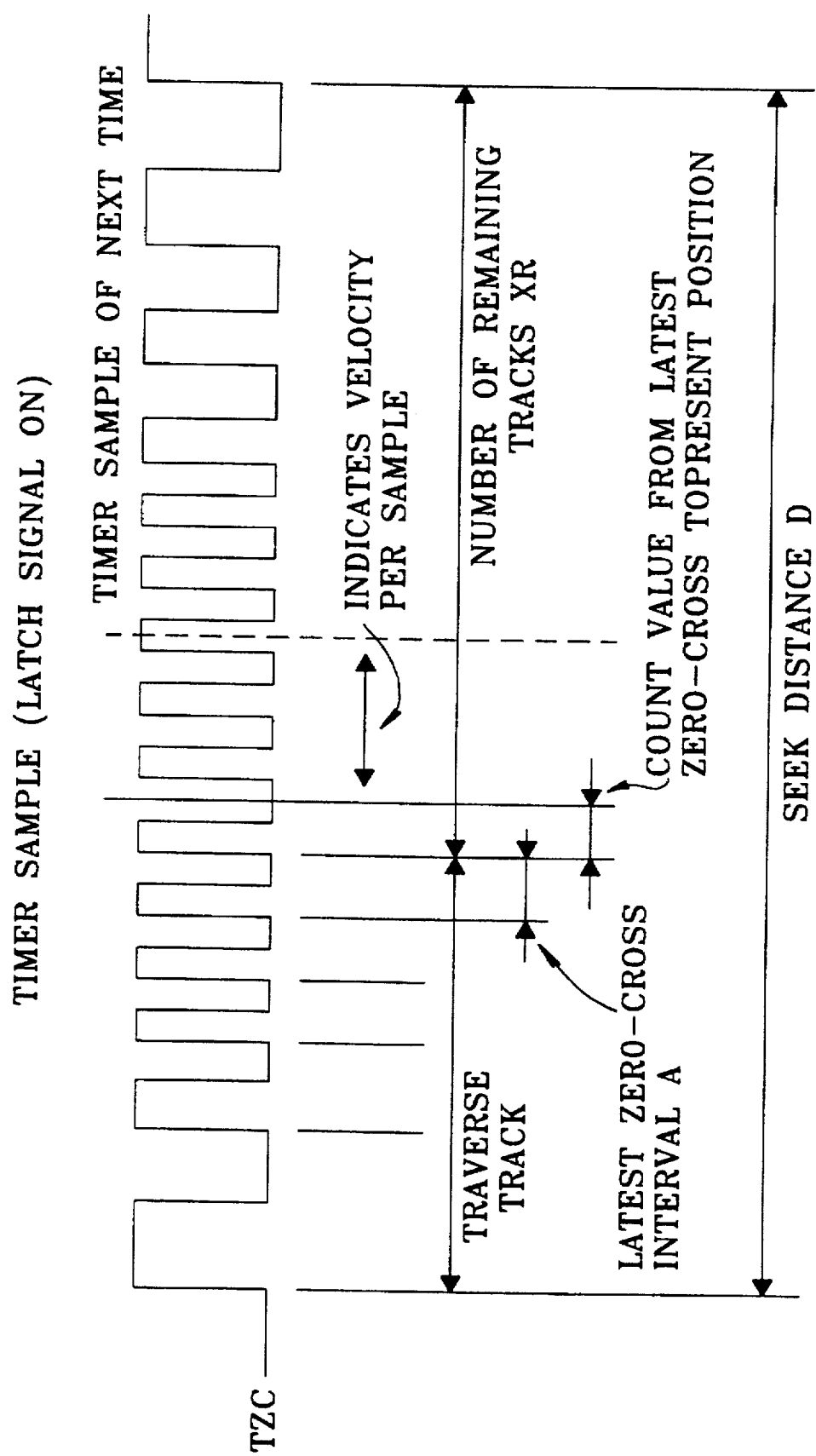
FIG. 17 is an explanatory diagram showing a process of calculating a present position from a count value in FIG. 15.
Figure 18:
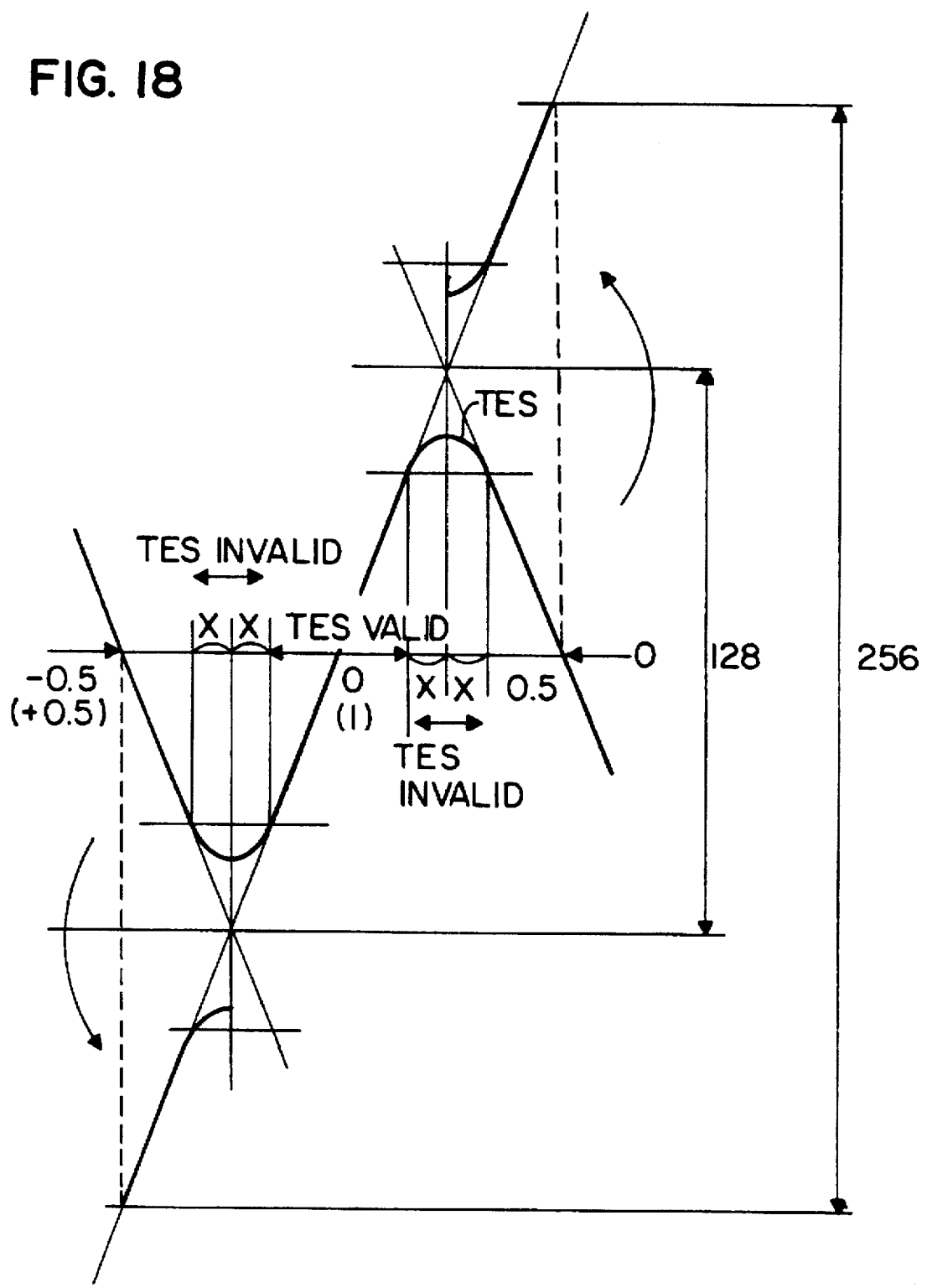
FIG. 18 is an explanatory diagram showing a process of calculating the present position from the analog value in FIG. 15.

FIG. 15 is a flowchart showing a present position calculation process in FIG. 8. FIG. 16 is a flowchart showing a process of calculation from the analog value. FIGS. 17 and 18 are explanatory diagram each showing the present position calculation process.

The present position calculation process will be explained with reference to FIG. 15.

(S70) The DSP 3 checks whether the seek status signal SKSTS is [3] (positioner acceleration status) or [4] (positioner constant velocity status) or [5] (positioner deceleration status).

(S71) The DSP 3_if the seek status signal SKSTS is [3], [4], and [5], this indicates the positioner control period_ therefore decides that the velocity of the light beams is high. During this period, an amplitude of the track error signal is small. Accordingly, a position in one track is obtained from a value of the track counter circuit 45.

As illustrated in FIG. 3, the DSP 3 obtains the latest zero-cross interval A and a count value B from the latest zero-cross to the present one. FIG. 17 shows a relation ship between the latest zero-cross interval A and the count value B from the latest zero-cross to the present one. Then, the intra one-track position is given by B/A.

(S72) On the other hand, the DSP 3_if the seek status signal SKSTS is not [3], [4] and [5] but [1], [2], [6] and [7]_decides that the velocity of the light beams is low. During this period, the amplitude of the track error signal TES is sufficiently large. Accordingly, the intra one-track position is obtained from an analog value of the track error signal TES.

The DSP 3 samples a digital value of the track error signal TES from the first analog/digital converter 43. Next, the DSP 3, as shown in FIG. 16, calculates the intra one-track position from the above sample value.

(S73) When the intra one-track position is obtained in this way, the DSP 3 calculates a present position. Hence, the DSP 3 obtains a number-of-remaining-tracks Xr of the latch circuit 69. Then, as illustrated in FIG. 17, the number-of-remaining-tracks Xr is subtracted from a seek distance (difference) D, thereby obtaining a number of traverse tracks. The intra one-track position is added to this value, thus calculating the present position. Thus, the present position calculation process is finished.

In this way, when the velocity of the light beams is high, the amplitude of the track error signal is small, and, therefore, the present position is calculated from the digital value relative to the track zero-cross signal TZC. On the other hand, when the velocity of the light beams is low, the amplitude of the track error signal is large, and, hence, the present position is calculated from the analog value of the track error signal TES. With this processing, it is possible to obtain the accurate present position irrespective of the velocity of the light beams.

Given next is an explanation of a process of calculating the present position from the analog value in step S72 of FIG. 15 with reference to FIGS. 16 and 18. In this embodiment, a resolution of the first A/D converter 43 is fully used for the sine wave track error signal TES.

(S74) The DSP 3, for normalization, obtains a digital value ADCTES by multiplying a digital value ADCTES of the sampled track error signal TES by a constant C.

(S75) The DSP 3 checks whether or not a fraction of the target position calculated in FIGS. 10A through 13 does not exceed 0.25 track. The DSP 3, when deciding that the fraction of the target position does not exceed 0.25 track, sets an intra one-track position ADCPOS to the digital value ADCTES. Then, the processing is finished.

(S76) The DSP 3, when deciding that the fraction of the target position is larger than 0.25 track, checks whether or not the fraction of the target position exceeds 0.75 track. The DSP 3, when deciding that the fraction of the target position exceeds 0.75 track, sets the intra one-track position ADCPOS to the digital value ADCTES. Then, the processing comes to an end.

(S77) The DSP 3, when deciding that the fraction of the target position is 0.25 track or more but does not exceed 0.75 tack, inverts a code of the digital value ADCTES to obtain −ADCTES.

(S78) The DSP 3 checks whether or not the fraction of the target position exceeds 0.5. The DSP 3, when deciding that the fraction of the target position exceeds 0.5, performs a calculation on the assumption that the intra one-track position ADCPOS is given by (Digital Value ADCTES−0.5 Track). Then, the processing terminates.

(S79) The DSP 3, when deciding that the fraction of the target position exceeds is 0.5 track or under, performs the calculation on the assumption that the intra one-track position ADCPOS is given by (Digital Value ADCTES+0.5 Track). Then, the processing terminates.

This operation will be described with reference to FIG. 18. The fraction of the target position is in a range that does not exceed 0.25 track or in a range that exceeds 0.75 track, and this implies that the fraction of the target position falls within a range of ±0.25 track. As depicted in FIG. 18, in this range, the digital value of the track error signal TES can be used as it is.

Whereas if the intra target position is beyond the ±0.25 track range, as shown in the Figure, the code of the digital value of the track error signal is inverted. Then, when the fraction of the target position exceeds 0.5 track (i.e., when the intra one-track target position is between −0.25 track and −0.5 track), a value for 0.5 track is subtracted from the track error signal ADCTES.

On the other hand, when the fraction of the target position does not exceed 0.5 track (that is, when the intra-one-track target position is between 0.25 track and 0.5 track), the value for 0.5 track is added to the track error signal ADCTES.

With this operation, there is taken such a form that the intra one-track position shifts with a change in signal polarity as indicated by an arrow in the Figure out of the ±0.25 track range. Therefore, the conversion into the digital value can be carried out by fully making use of the resolution of the A/D converter with respect to the sine wave track error signal.

As described above, the track error signal TES assumes the sine wave, and hence, as illustrated in FIG. 18, the accurate position can not be detected at a round portion (within X-range in the Figure) in the vicinity of the peak. If the feedback control is applied at this portion where the position can not be accurately detected, the control becomes unstable. For this reason, the control quantity is zeroized at this portion.

Figure 19:
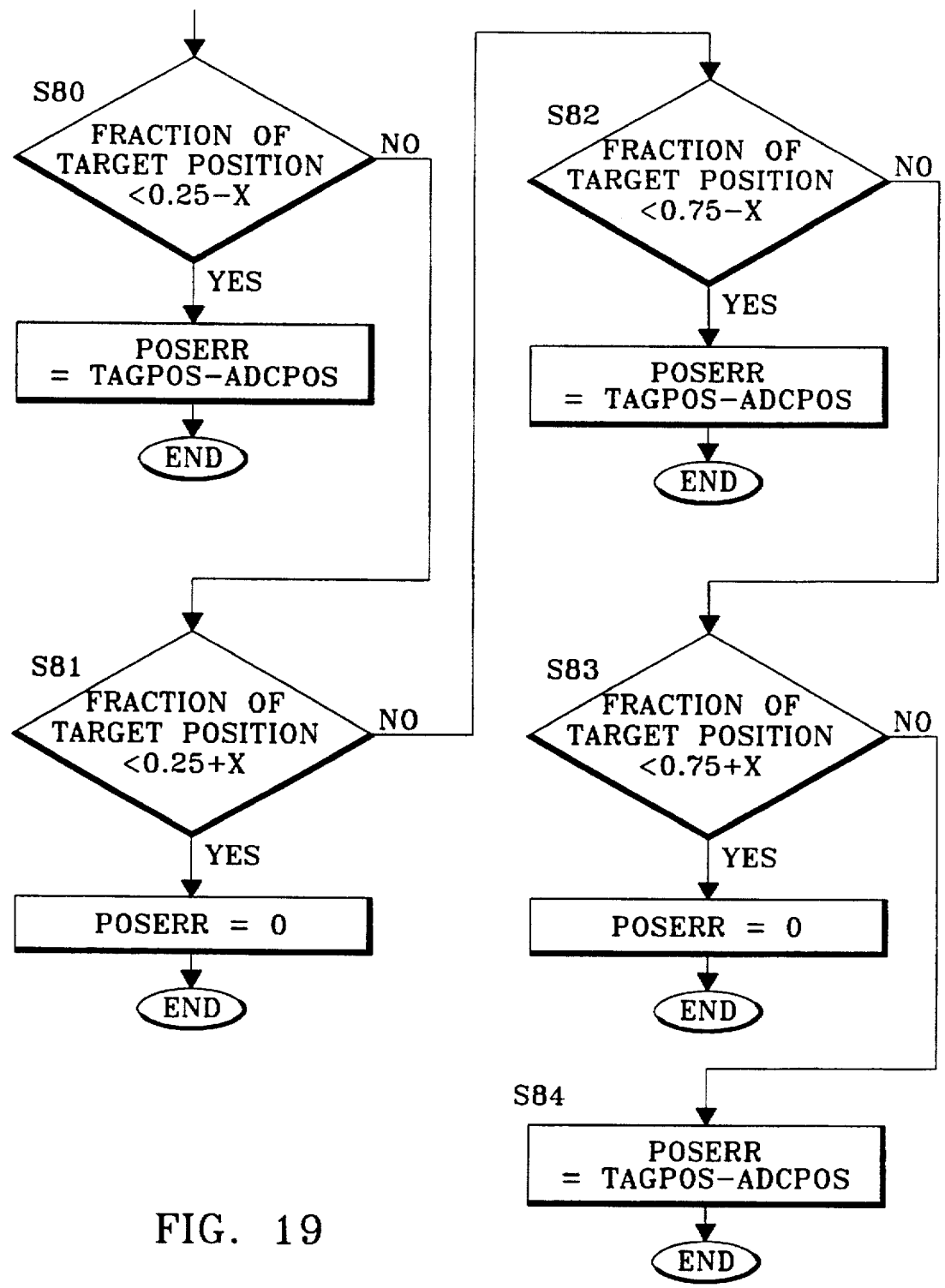
FIG. 19 is a flowchart of a position error calculation process in FIG. 8.

FIG. 19 is a flowchart of the position error calculation process therefor.

(S80) The DSP 3 checks whether or not the fraction of the target position TAGPOS exceeds (0.25−X). Herein, X represents a length of a rounded interval in the vicinity of the above-mentioned peak but is a range that does not exceed 0.25 track. The DSP 3, when deciding that the fraction of the target position TAGPOS does not exceed (0.25−X), calculates a position error such as (Target Position TAGPOS−Present Position ADCPOS).

(S81) The DSP 3, when deciding that the fraction of the target position TAGPOS exceeds (0.25−X), checks whether or not the fraction of the target position TAGPOS exceeds (0.25+X). If the fraction of the target position TAGPOS does not exceed (0.25+X), the fraction of the target position is in a range of (0.25−X) through (0.25+X), and hence the position error POSERR is zeroized.

(S82) The DSP 3, when deciding that the fraction of the target position exceeds (0.25+X), checks whether or not the fraction of the target position TAGPOS exceeds (0.75−X). The DSP 3, when deciding that the fraction of the target position TAGPOS does not exceed (0.75−X), calculates the position error POSERR such as (Target Position TAGPOS−Present Position ADCPOS).

(S83) The DSP 3, when deciding that the fraction of the target position TAGPOS exceeds (0.75−X), checks whether or not the fraction of the target position TAGPOS exceeds (0.75+X). If the fraction of the target position TAGPOS does not exceed (0.75+X), the fraction of the target position is in a range of (0.75−X) to (0.75+X), and hence the position error POSERR is zeroized.

(S84) The DSP 3, when deciding that the fraction of the target position TAGPOS exceeds (0.75+X), the position error POSERR is calculated such as (Target Position TAGPOS−Present Position ADCPOS). Then, the processing terminates.

As explained above, as shown in FIG. 18, in the interval with the rounded portion in the vicinity of the peak of the track error signal TES, the position error is calculated to be zero, thereby zeroizing the control quantity. The instability of the control is thus prevented.

Next, there will be described a method of zeroizing the control output for accomplishing the same object by way of a modified embodiment.

Figure 20:
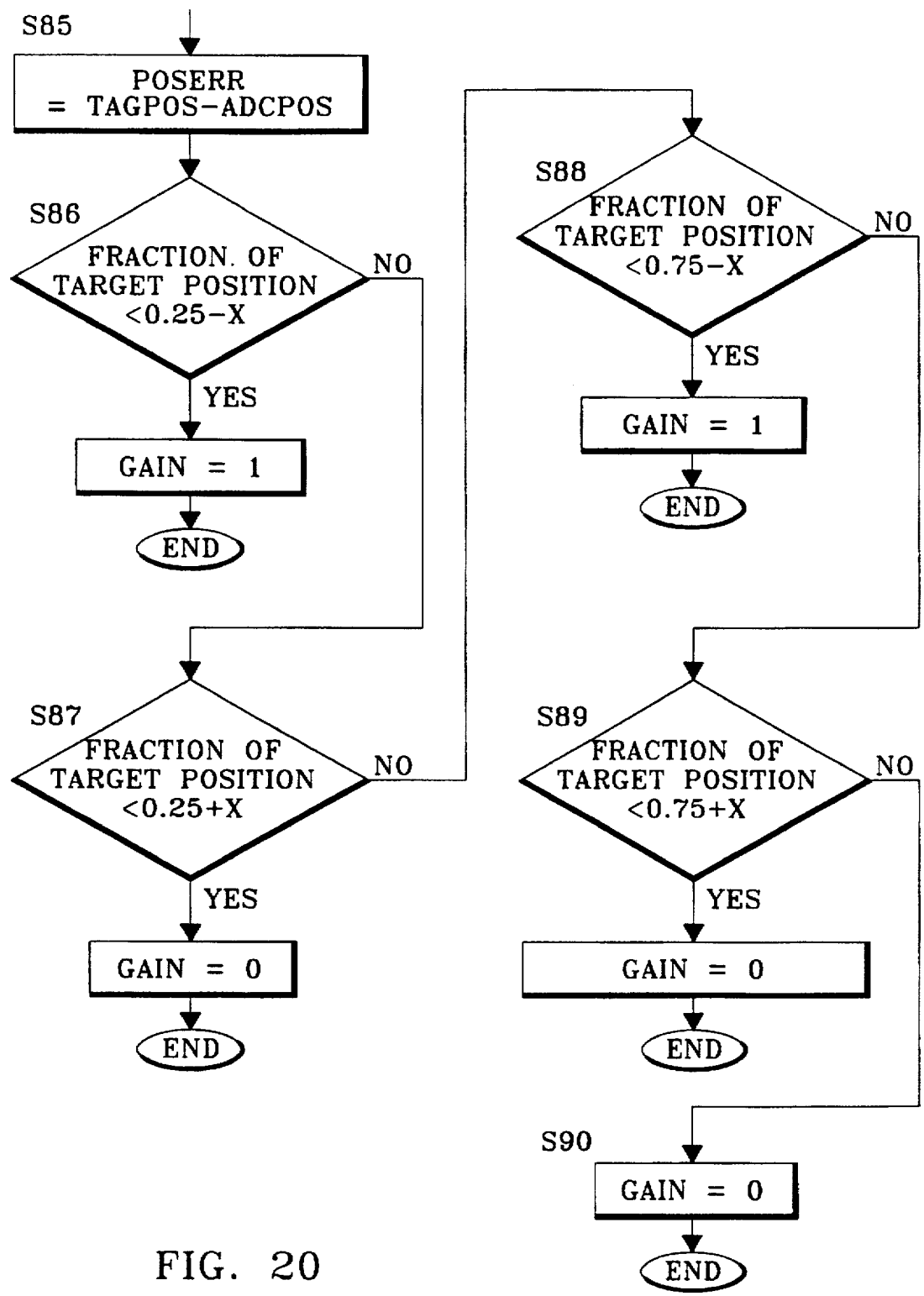
FIG. 20 is a processing flowchart showing a modified embodiment of the position error calculation in FIG. 8.
Figure 21:
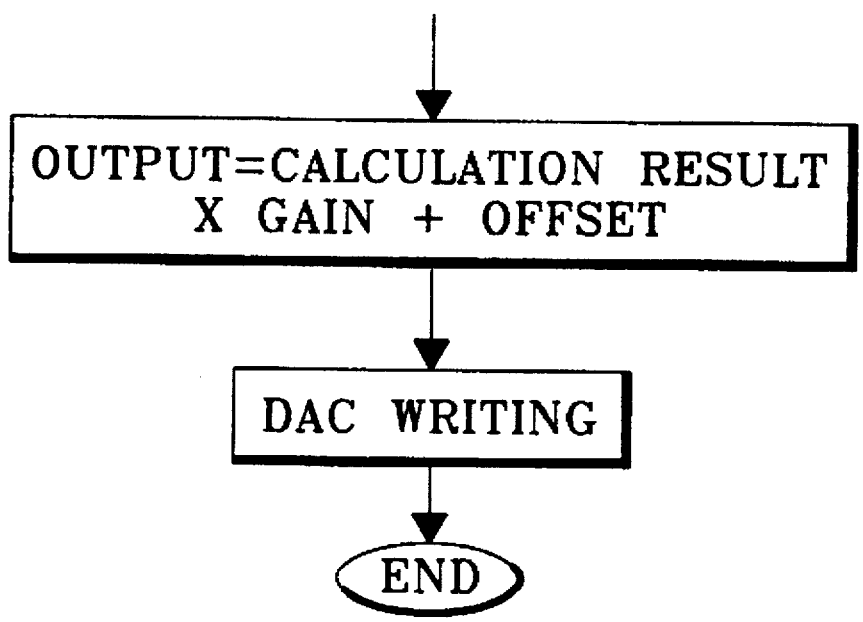
FIG. 21 is a flowchart of an actuator DAC output process in FIG. 8.

FIG. 20 is a processing flowchart of the modified embodiment of the position error calculation. FIG. 21 is a processing flowchart of an output of the actuator DAC.

(S85) At first, the DSP 3 calculates the position error POSERR by (Target Position TAGPOS–Present Position ADCPOS).

(S86) the DSP 3 checks whether or not the fraction of the target position TAGPOS exceeds (0.25–X). The DSP 3, when deciding that the fraction of the target position TAGPOS does not exceed (0.25–X), sets a gain GAIN to [1], and the processing is finished.

(S87) The DSP 3, when deciding that the fraction of the target position TAGPOS exceeds (0.25–X), checks whether or not the fraction of the target position TAGPOS exceeds (0.25+X). If the fraction of the target position TAGPOS does not exceed (0.25+X), the fraction of the target position is in a range of (0.25–X) through (0.25+X), and hence the gain GAIN is set to [0], and the processing terminates.

(S88) The DSP 3, when deciding that the fraction of the target position exceeds (0.25+X), checks whether or not the fraction of the target position TAGPOS exceeds (0.75–X). The DSP 3, when deciding that the fraction of the target position TAGPOS does not exceed (0.75–X), sets the gain GAIN to [1]. Then, the processing comes to an end.

(S89) The DSP 3, when deciding that the fraction of the target position TAGPOS exceeds (0.75–X), checks whether or not the fraction of the target position TAGPOS exceeds (0.75+X). If the fraction of the target position TAGPOS does not exceed (0.75+X), the fraction of the target position is in a range of (0.75–X) to (0.75+X), and hence the gain GAIN is set to [0]. Then, the processing terminates.

(S90) The DSP 3, when deciding that the fraction of the target position TAGPOS exceeds (0.75+X), sets the gain GAIN to [1]. Then, the processing is finished.

On the other hand, in the output process (step S36 of FIG. 8) shown in FIG. 21, a result of calculating the output the actuator DAC in step S35 of FIG. 8 is multiplied by the gain GAIN described above. Further, an offset value is added, thus calculating the output. Subsequently, a result of this calculation is outputted (written) to the D/A converter 49 of the actuator.

As explained above, as shown in FIG. 18, in the interval with the rounded portion in the vicinity of the peak of the track error signal TES, the gain is calculated to be zero, thereby zeroizing the control quantity. The instability of the control is thus prevented.

Next, there will be described a PID calculation process shown in FIG. 8.

Figure 22:
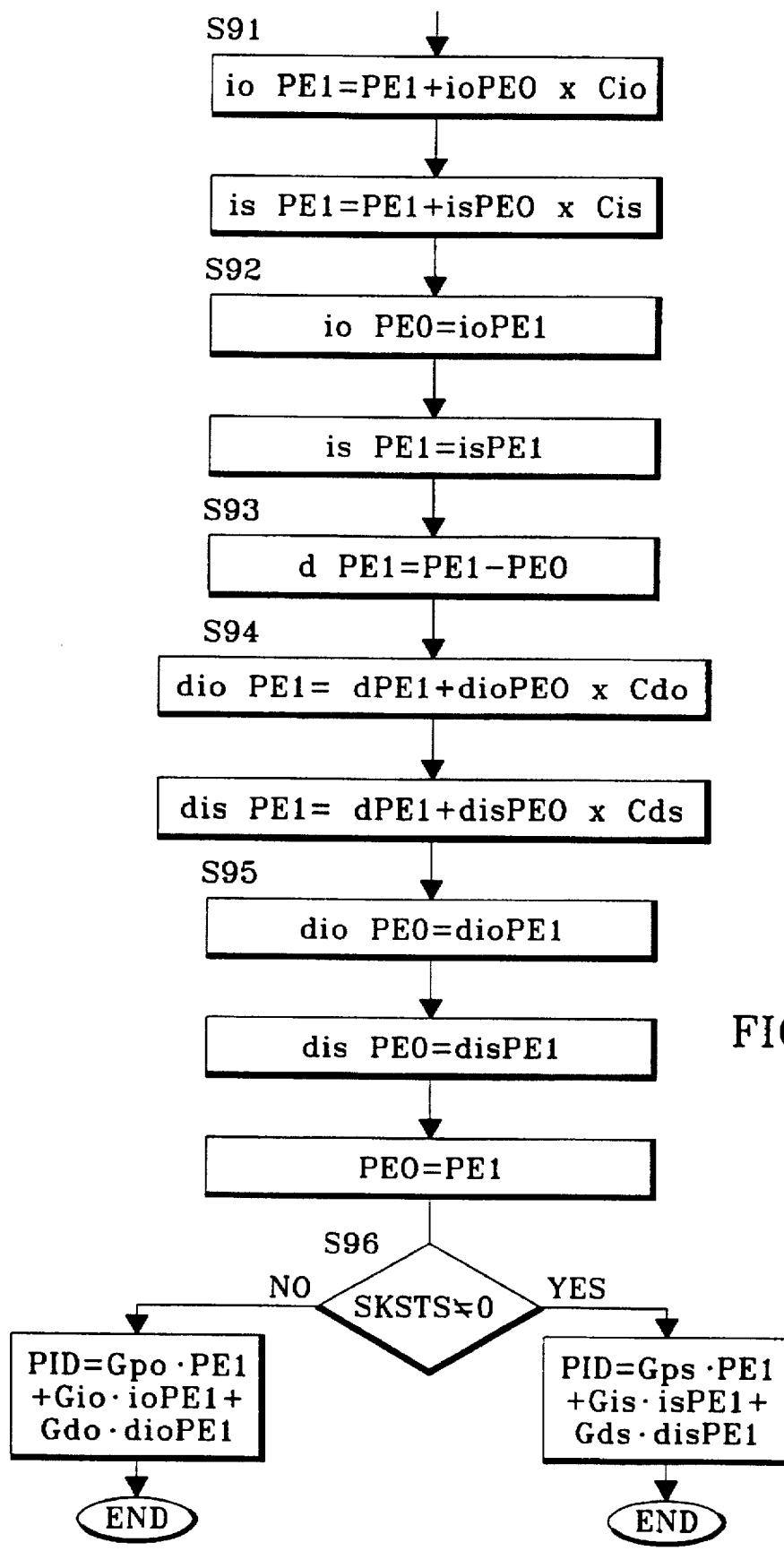
FIG. 22 is a flowchart of a PID calculation process in FIG. 8.
Figure 23:
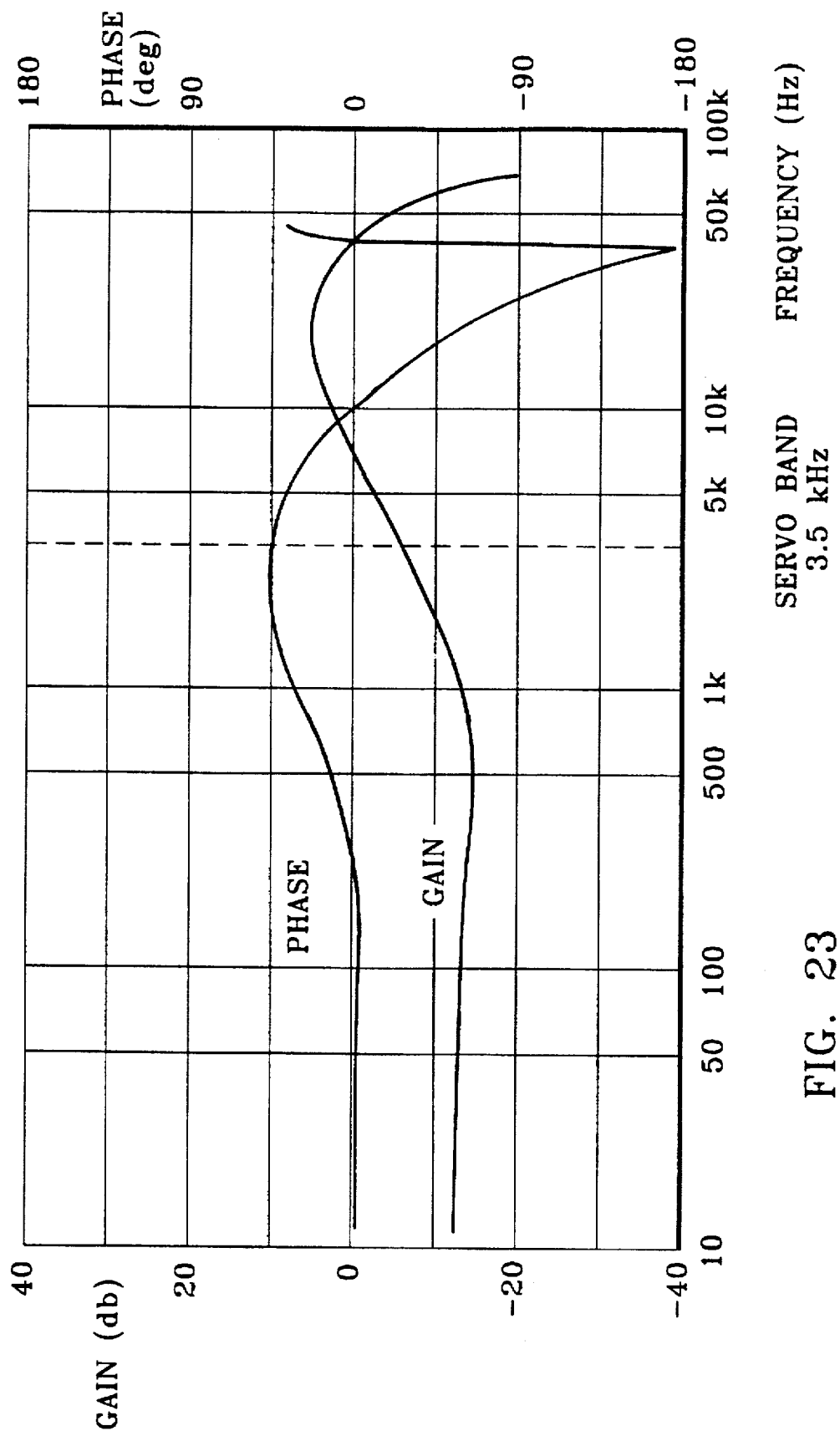
FIG. 23 is an explanatory diagram of the PID calculation process in FIG. 22.

FIG. 22 is a flowchart of the PID calculation process in FIG. 8. FIG. 23 is an explanatory diagram showing the PID calculation process.

During the seek, there increase a moving quantity at the sampling interval and the position error as well. For this reason, if the position error during the seek is controlled to be the same as the error during the ON-track process (during the fine control), it is required that the input gain be decreased during the seek. When decreasing the input gain, it takes such a form that a PID filter characteristic as shown in FIG. 23 is frequency-shifted by the decrease in the input gain.

As a result, a phase allowance is reduced, there declines the stability at the point of time when the light beam reaches the target track. Under such circumstances, in accordance with this embodiment, the PID calculation is performed by use of parameters of such a compensation system as to sufficiently getting the phase allowance, counting on the reduction in gain during the seek.

(S91) An integral term ioPE1 at the sampling effected this time during the fine control is obtained by the following formula:

$$ioPE1 = PE1 + ioPE0 \times Cio$$

where the PE1 is the position error of this time, ioPE0 is the integral term at the sampling effected last time during the fine control, and Cio is the integral constant.

Similarly, an integral term isPE1 at the sampling effected this time during the seek control is given by the following formula:

$$isPE1 = PE1 + isPE0 \times Cis$$

where the PE1 is the position error of this time, isPE0 is the integral term at the sampling effected last time during the fine control, and Cis is the integral constant.

(S92) Next, the integral term ioPE0 at the sampling of the last time during the fine control is updated by the thus obtained integral term ioPE1 at the sampling conducted this time. Similarly, the integral term isPE0 at the sampling conducted last time during the seek control is updated by the thus obtained integral term isPE1 at the sampling effected this time.

(S93) Next, a differential dPE1 of the position error is obtained by the formula which follows:

$$dPE1 = PE1 - PE0$$

where PE1 is the position error of this time, and PE0 is the position error of the last time.

(S94) A differential dioPE1 at the sampling performed this time during the fine control is given by the formula which follows:

$$dioPE1 = dPE1 + dioPE0 \times Cdo$$

where dPE1 is the differential of the position error of this time, dioPE0 is the differential term at the sampling of the last time during the fine control, and Cdo is the differential constant.

Similarly, a differential term disPE1 at the sampling of this time during the seek control is obtained by the following formula:

$$disPE1 = dPE1 + disPE0 \times Cds$$

where dPE1 is the differential of the position error of this time, disPE0 is the differential term at the sampling of the last time during the seek control, and Cds is the differential constant.

(S95) Next, the integral term dioPE0 at the sampling of the last time during the fine control is updated by the thus obtained differential term dioPE1 at the sampling conducted this time. Similarly, the differential term disPE0 at the sampling conducted last time during the seek control is updated by the thus obtained differential term disPE1 at the sampling effected this time. Further, the position error PE0 of the last time is updated to the position error PE1 of this time.

(S96) Next, there is checked whether or not the seek status signal SKSTS is a value other than [0]. If the seek status signal SKSTS is |0|, the process is on the fine control (during the ON-track status), and hence a PID value PID is obtained by the following formula:

$$PID=Gpo \cdot PE1+Gio \cdot isPE1+Gdo \cdot dioPE1$$

where Gpo, Gio and Gdo are the respective gains.

Whereas if the seek status signal SKSTS is not |0|, the process is on the seek control, and, therefore, the PID value PID is obtained by the formula which follows:

$$PID=Gps \cdot PE1+Gis \cdot isPE1+Gds \cdot disPE1$$

where Gps, Gis and Gds are the respective gains.

Thus, there are varied the integral constant for determining a cut-off frequency of the low-pass filter characteristic and the differential constant for determining a cut-off frequency of a high-pass filter characteristic.

Therefore, the phase allowance is acquired during even the seek. The stability when the light beam reaches the target track is thereby enhanced.

Next, there will be described a modified embodiment of the calculation of the present velocity that has been explained in FIG. 7.

Figure 24:
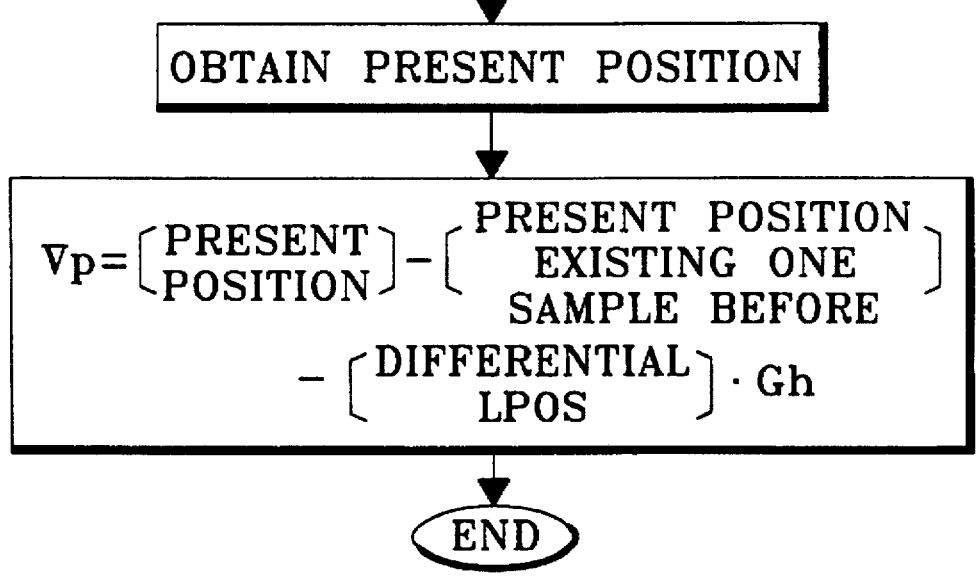
FIG. 24 is a flowchart of a present velocity calculation process in FIG. 7.

FIG. 24 is a flowchart showing the modified embodiment of the calculation process of the present velocity of FIG. 7.

During the seek control, a velocity signal obtained from the track counter 45 contains a relative velocity between the positioner 2 and the objective lens 20 in addition to the real velocity of the positioner (optical head) 2. It is therefore required that the relative velocity be subtracted from the velocity signal obtained.

A signal corresponding to the relative velocity between the positioner 2 and the objective lens 20 is a differential value of the lens position signal LPOS. Accordingly, this differential value is subtracted from the velocity signal, thus obtaining a real velocity of the positioner.

That is, as shown in FIG. 24, the present position is acquired. Then, a present velocity Vp is given by the following formula:

$$Vp=Xp1-Xp0-dL \cdot Gh$$

where Xp1 is the present position, Xp0 is the present position one sample before, dL is the differentiated lens position signal, and Gh is the normalized gain.

With such processing, the real velocity of the positioner is obtained by subtracting the relative velocity between the positioner 2 and the objective lens 20 from the signal given out of the track counter 45. This differentiated lens position signal dL is calculated in the LPOS calculation process (step S3) shown in FIG. 4B. Therefore, this is easily actualized by diverting a result of this calculation.

Next, the feedforward control will be discussed. The feedforward control is effective as a method of preventing a delay of the control. As illustrated in FIGS. 7 and 8, the feedforward value on the occasion of the seek is given to each of the track actuator and the positioner in accordance with the seek status.

That feedforward value is, in the case of the track actuator, a value corresponding to the acceleration α1 used for the addition of the target position but is, in the case of the positioner, a value corresponding to the acceleration α2 used for the calculation of the target velocity.

When increasing the feedforward value, a larger acceleration quantity is to be acquired, and the time for reaching the target position becomes shorter. However, the control during the seek gets more difficult, correspondingly. Acceleration performance of each of the track actuator and the positioner is proportional to the drive current under a saturation current of the drive circuit, and hence it is desirable that the feedforward value be a value corresponding to the value of acceleration.

On the other hand, the VCM 23 for moving the positioner requires a large torque. Therefore, a coil of the VCM 23 has a large inductance component. The current is late to start flowing, correspondingly. Then, in accordance with this embodiment, a timing when imparting the feedforward to the positioner is controlled faster than a timing at which the acceleration changes, thereby preventing the delay.

Figure 25:
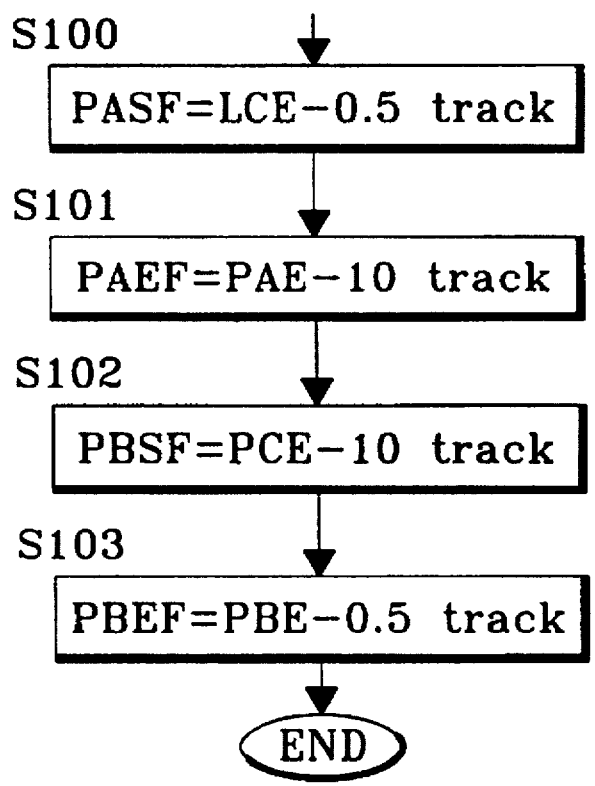
FIG. 25 is a flowchart showing a modified embodiment of the seek command process in FIG. 5.
Figure 28:
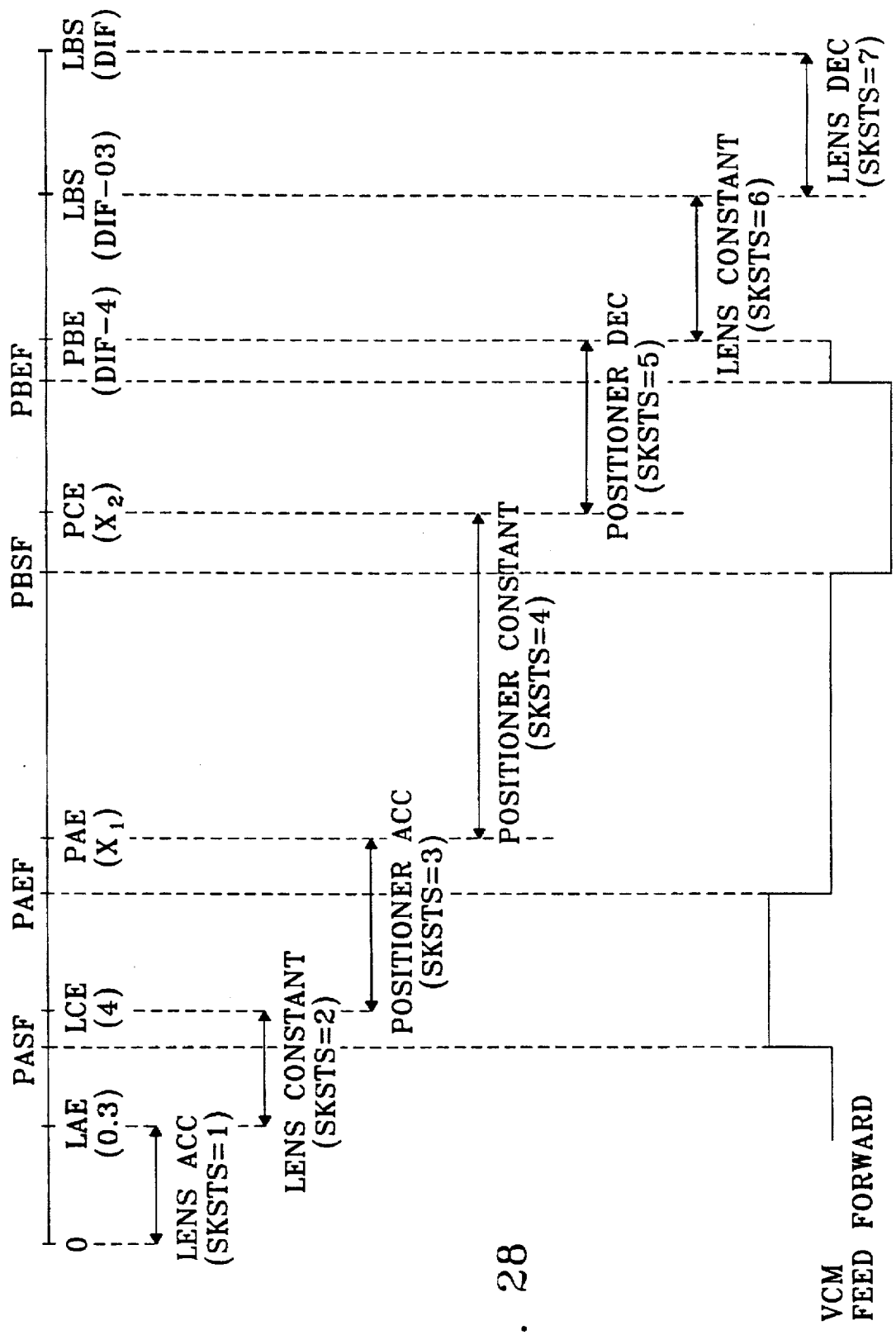
FIG. 28 is an explanatory diagram of the seek process in the modified embodiment of FIG. 25.
Figure 29:
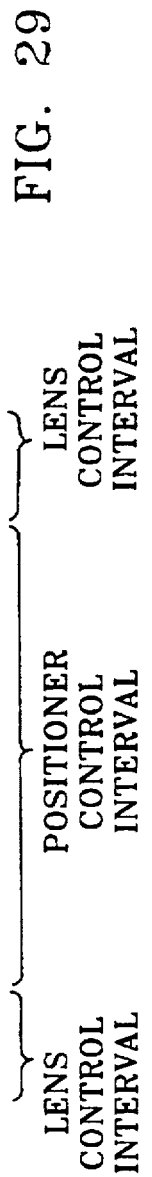
FIG. 29 is an explanatory diagram of feedforward control in the modified embodiment of FIG. 25.
Figure 30:
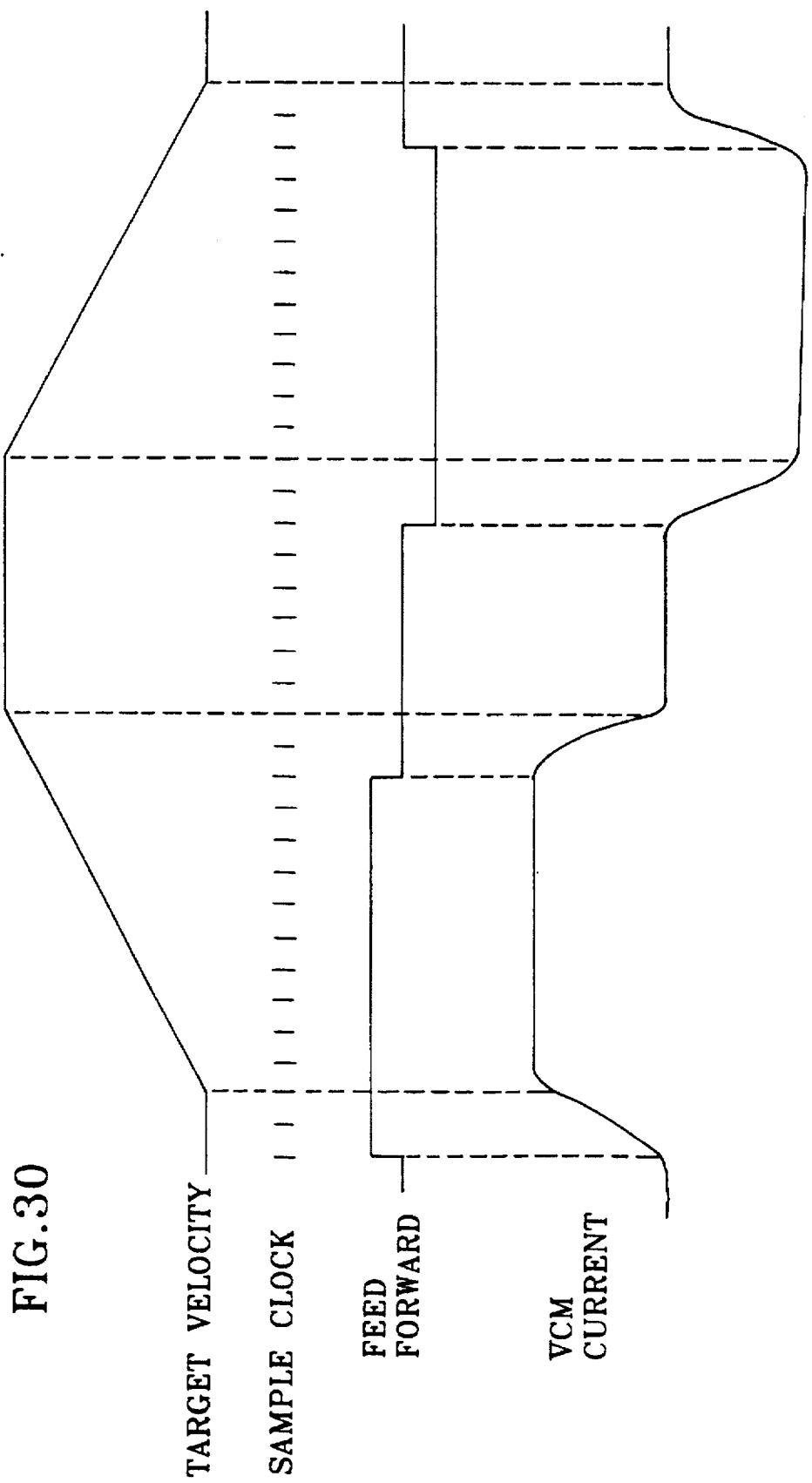
FIG. 30 is an explanatory diagram of a feedforward operation in the modified embodiment of FIG. 25.

FIG. 25 is a flowchart showing a modified embodiment of a seek command process therefor. FIGS. 26A through 27B are flowcharts showing a modified embodiment of the target position calculation process. FIG. 28 is an explanatory diagram of the seek process thereof. FIG. 29 is an explanatory diagram of the feedforward control thereof. FIG. 30 is an explanatory diagram showing how the feedforward operation operates.

The processing in FIG. 25 is executed additionally after the seek command process explained in FIG. 5.

(S100) The DSP 3 sets a positioner acceleration start track position PASF such as (Lens Constant Velocity End Track Position LCE–0.5 Track). That is, the positioner acceleration start track position is the lens constant velocity end track position LCE, while the acceleration start track position is set 0.5 track anterior thereto.

(S101) The DSP 3 sets a positioner acceleration end track position PAEF such as (Positioner Acceleration End Track Position PAE–10 Tracks). That is, the positioner acceleration end track position (i.e., positioner constant velocity start track position) is PAE, while the acceleration end track position is set 10 tracks anterior thereto.

(S102) The DSP 3 sets the positioner deceleration start position PBSF such as (Positioner Constant Velocity End Position PCE–10 Tracks). That is, for the positioner deceleration start track position in FIG. 5, the positioner deceleration start track position is set 10 tracks anterior thereto.

(S103) The DSP 3 sets the positioner deceleration end track position PBEF such as (Positioner Deceleration End Position PBE–0.5 Track). That is, for the positioner deceleration end track position in FIG. 5, the positioner deceleration end track position is set 0.5 track anterior thereto.

FIG. 28 illustrates the respective positions PASF, PAEF, PBSF and PBEF. That is, the feedforward value is applied before the starts of the acceleration interval and the deceleration interval as well. With respect to the acceleration interval and the deceleration interval, since the acceleration changes at a target velocity, the feedforward is started before the change in the acceleration at the target velocity.

By the way, the VCM 23 for moving the positioner 2 needs a large torque. Hence, the coil of the VCM 23 has a larger inductance. The current is late to start flowing, correspondingly. Further, when performing the sample servo control by use of the DSP 3, there is produced a delay due to the sampling process.

For this reason, when the applying the feedforward quantity, a control error quantity increases, and an overshoot quantity also augments. The control system is thereby made instable. Then, a timing of imparting the feedforward to the positioner 2 is set faster than the timing when the acceleration changes in a predetermined target velocity curve. With this processing, the error quantity is reduced, and the overshoot quantity is also decreased.

Figure 10B:
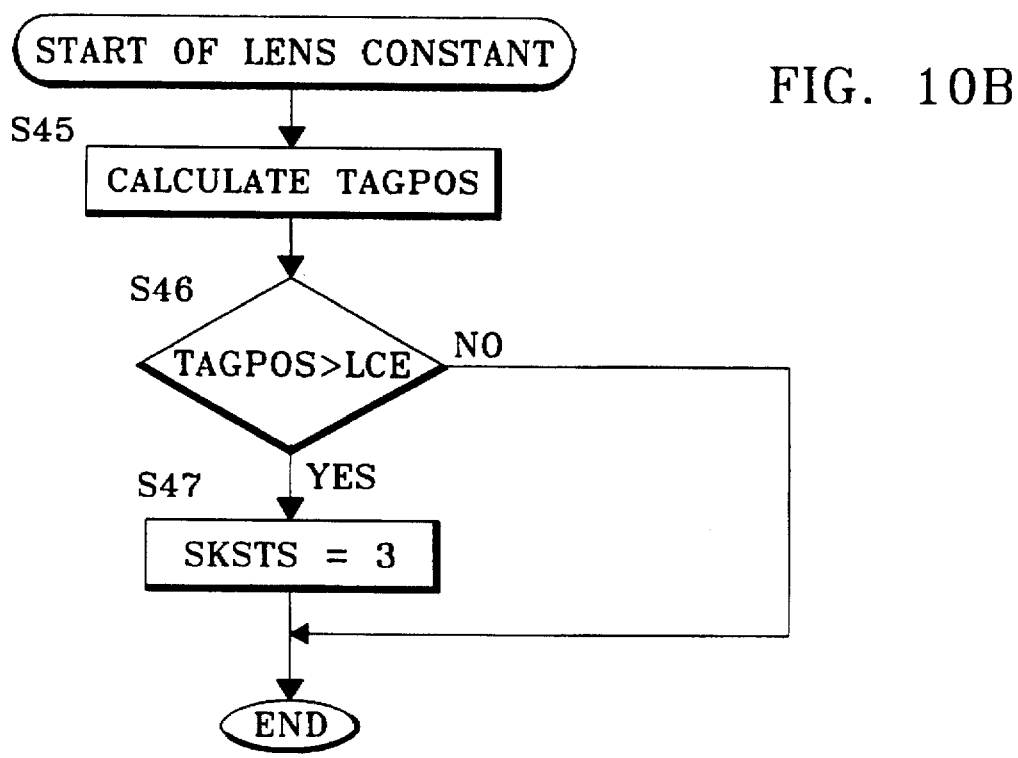
FIG. 10B is a flowchart of the target position calculation process at a lens constant velocity in FIG. 8.
Figure 11A:
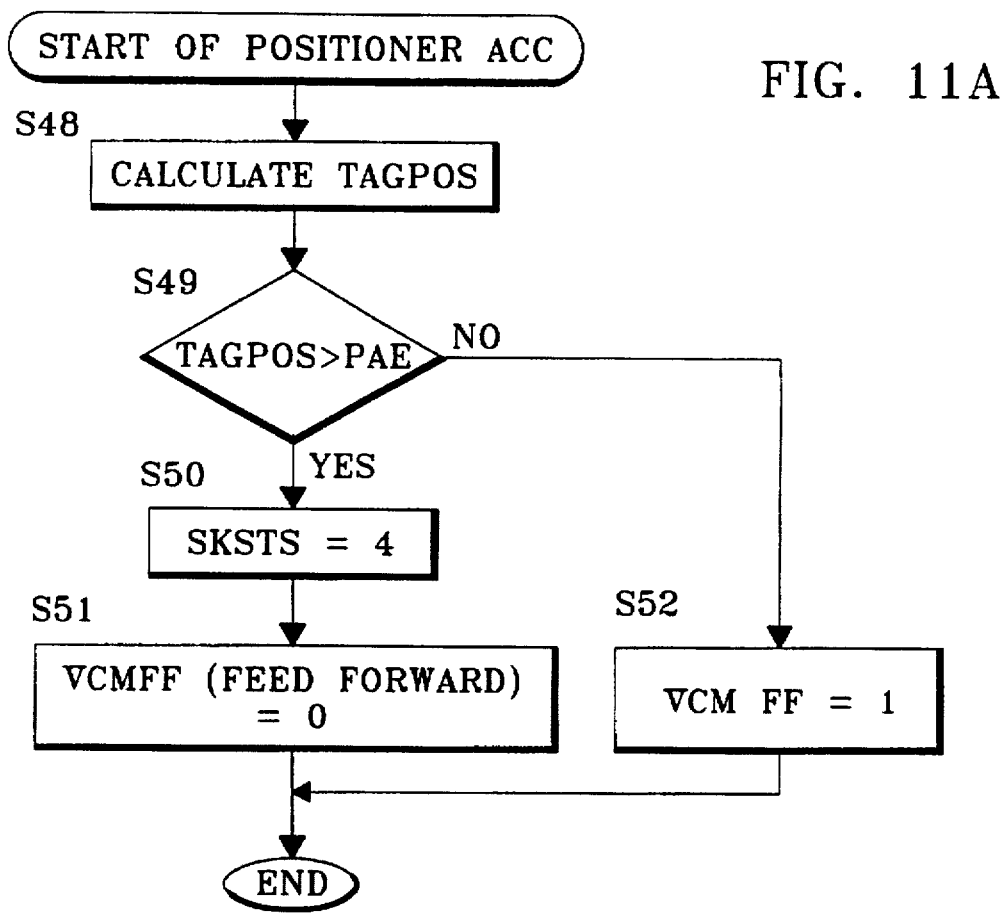
FIG. 11A is a flowchart of the target position calculation process at a positioner acceleration in FIG. 8.
Figure 11B:
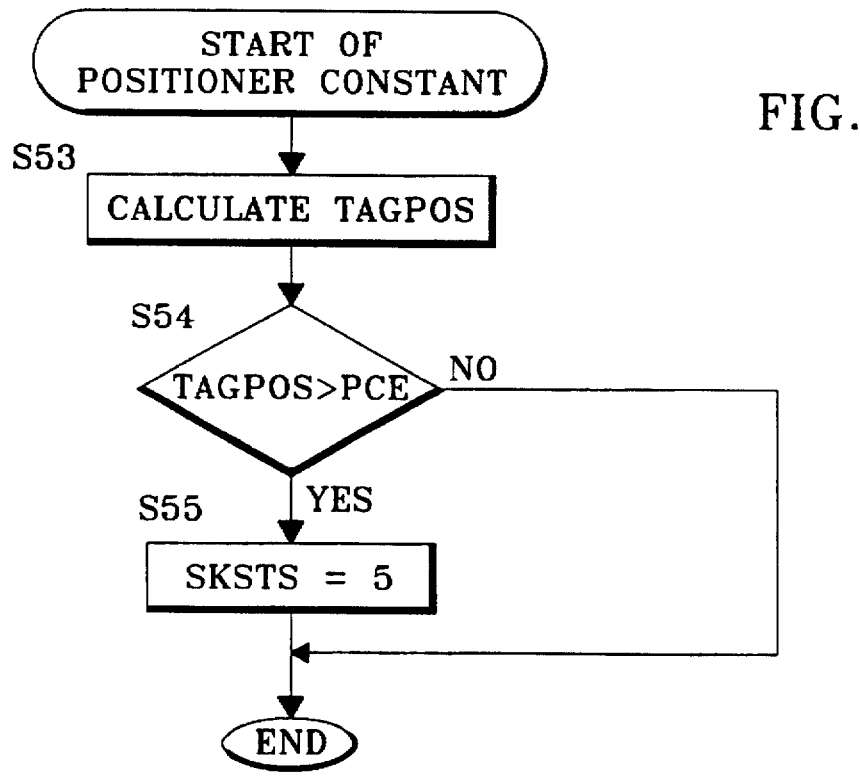
FIG. 11B is a flowchart of the target position calculation process at a positioner constant velocity in FIG. 8.
Figure 12A:
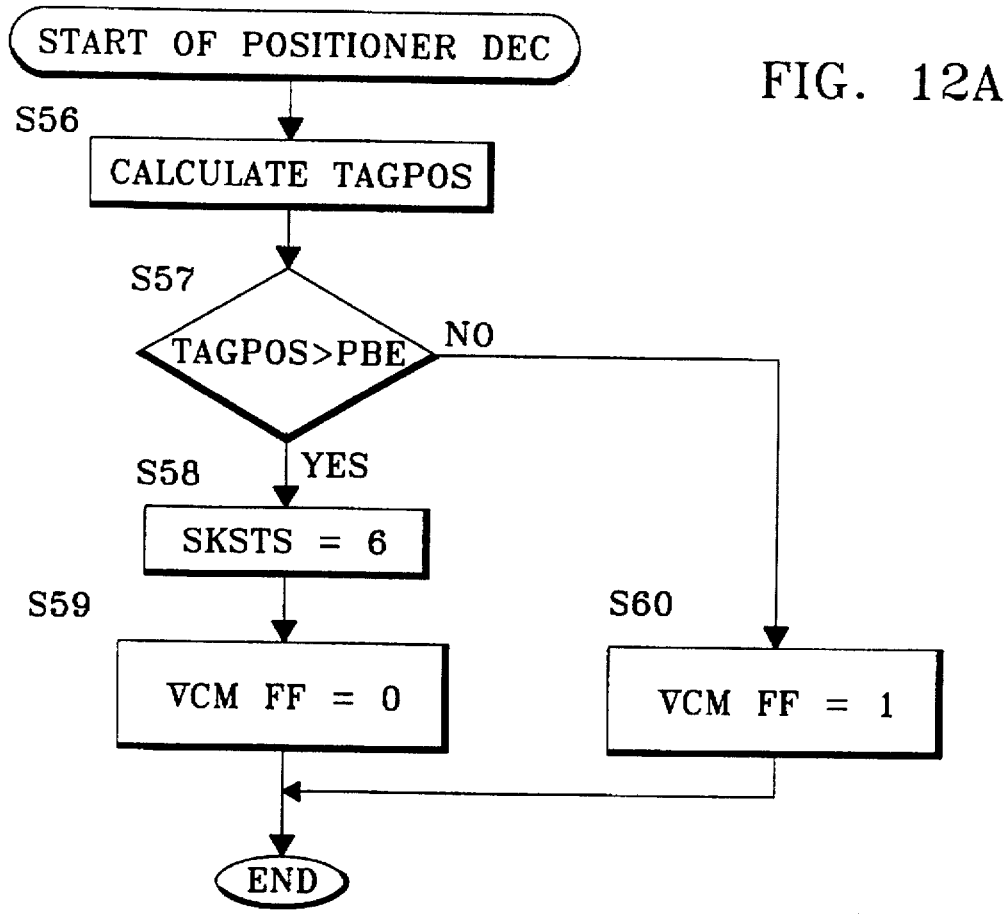
FIG. 12A is a flowchart of the target position calculation process at a positioner deceleration in FIG. 8.
Figure 12B:
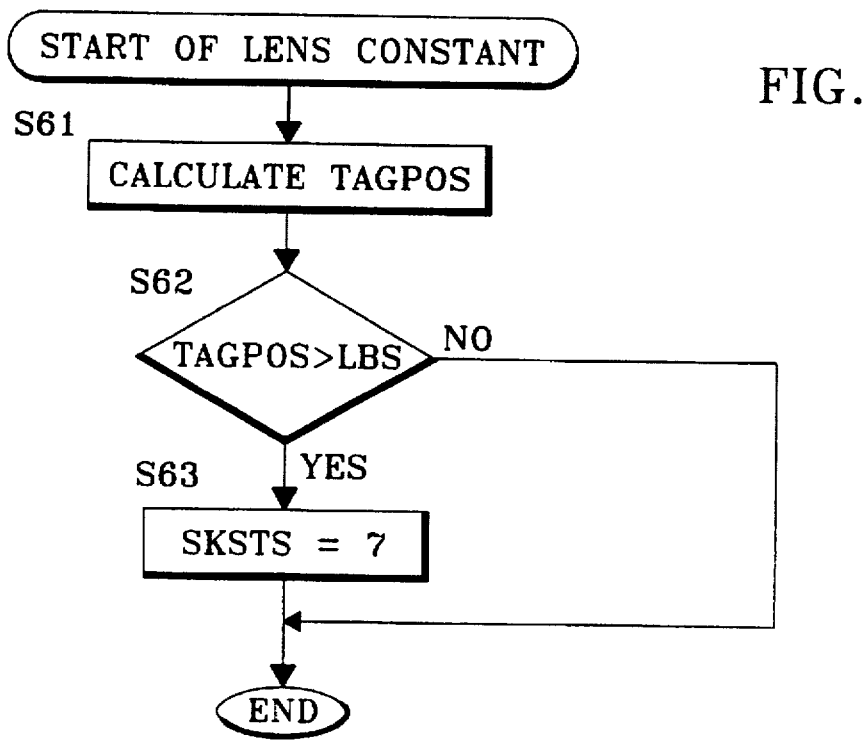
FIG. 12B is a flowchart of the target position calculation process at a lens constant velocity in FIG. 8.
Figures 27A, 27B:
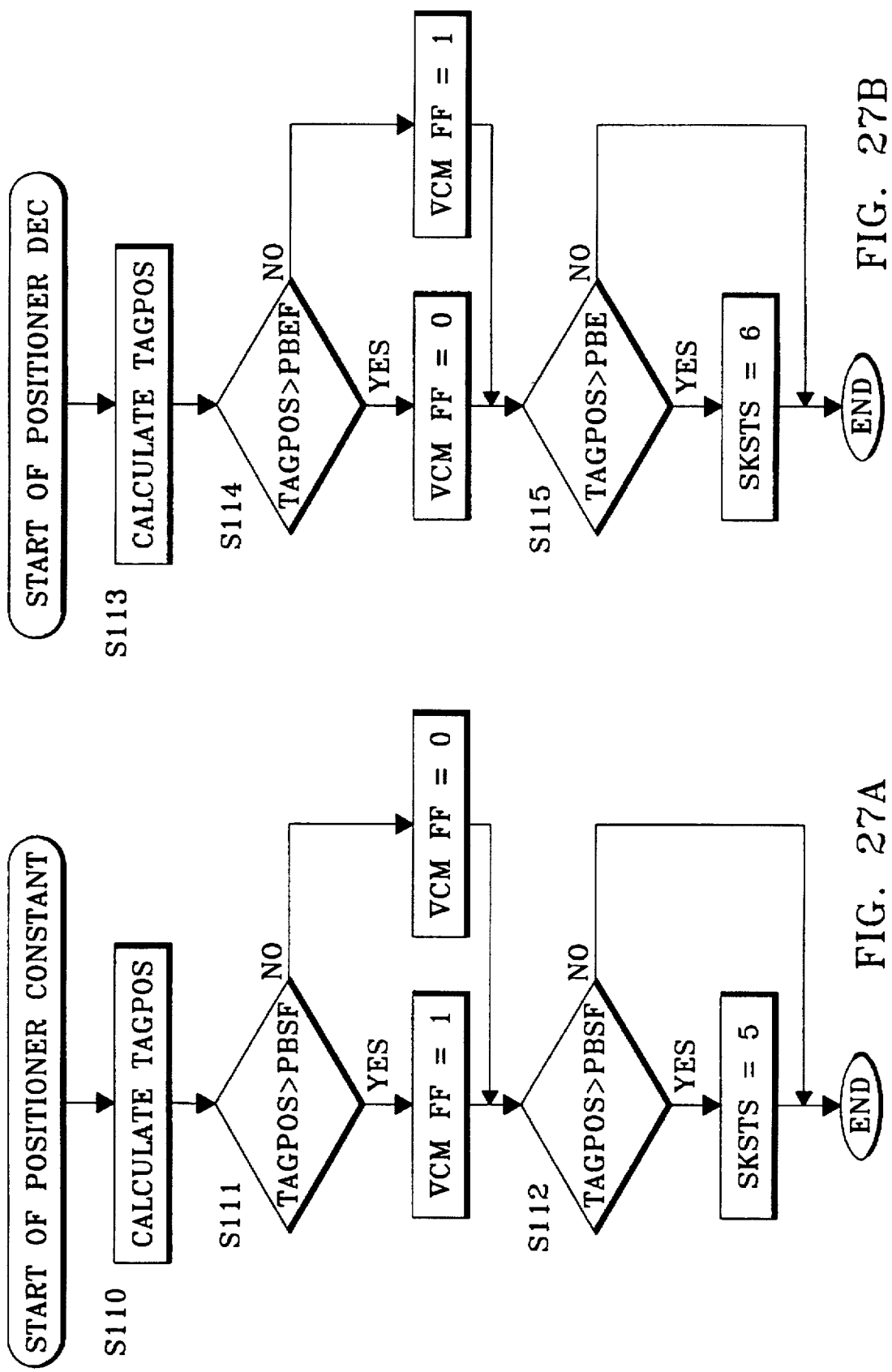
FIG. 27A is a flowchart of the target position calculation process at the positioner constant velocity in the modified embodiment of FIG. 25.
FIG. 27B is a flowchart of the target position calculation process at the positioner deceleration in the modified embodiment of FIG. 25.

On the other hand, with respect to the calculation process of the target position in response thereto, the lens constant velocity process shown in FIG. 10B changes to a process shown in FIG. 26A; the positioner acceleration process shown in FIG. 11A changes to a process illustrated in FIG. 27A; and the positioner deceleration process shown in FIG. 12A varies to a process shown in FIG. 27B.

To begin with, the target position calculation process in the lens constant velocity status of FIG. 26A will be described.

(S104) The DSP 3 calculates the target position TAGPOS. The target position x at the constant velocity is given by the above formula (3), where α1 is the acceleration, t is the time, and t1 is the acceleration end time.

(S105) Next, the DSP 3 checks whether or not the target position TAGPOS exceeds the positioner acceleration start track position PASF. The DSP 3_when deciding that the target position TAGPOS is over the positioner acceleration start track position PASF, this indicates that the feedforward start position is reached,_therefore sets ON ([1]) the VCM feedforward flag. Reversely, the DSP 3_when deciding that the target position TAGPOS does not exceed the positioner acceleration start track position PASF, this indicates that the feedforward start position is not yet reached,_therefore sets OFF ([0]) the VCM feedforward flag.

(S106) Next, the DSP 3 checks whether or not the target position TAGPOS exceeds the lens constant velocity end track position LCE. The DSP 3, if the target position TAGPOS is not over the lens constant velocity end track position LCE, finishes the processing. On the other hand, the DSP 3_if the target position TAGPOS is over the lens constant velocity end track position LCE, this indicates that it exceeds the lens constant velocity period_therefore changes the seek status signal SKSTS to [3] (positioner acceleration status). Then, the processing comes to an end.

Next, the target position calculation process in the positioner acceleration status will be explained with reference to FIG. 26B.

(S107) The DSP 3 calculates the target position TAGPOS in the above formula (4).

(S108) Next, the DSP 3 checks whether or not the target position TAGPOS exceeds the positioner acceleration end track position PAEF for the feedforward. The DSP 3_when deciding that the target position TAGPOS is over the positioner acceleration end track position PAEF, this indicates that the feedforward end position is reached_therefore sets OFF ([0]) the VCM feedforward flag. Reversely, the DSP 3_deciding that the target position TAGPOS does not exceed the positioner acceleration end track position PAEF, this indicates that the feedforward end position is not yet reached_therefore sets ON ([1]) the VCM feedforward flag.

(S109) Next, the DSP 3 checks whether or not the target position TAGPOS exceeds the positioner acceleration end track position PAE. The DSP 3_if the target position TAGPOS is over the positioner acceleration end track position PAE, this indicates that it exceeds the positioner acceleration period_therefore changes the seek status signal SKSTS to [4] (positioner constant velocity status). On the other hand, the DSP 3_if the target position TAGPOS does not exceed the positioner acceleration end track position PAE, this is still in the positioner acceleration period_therefore finishes the processing.

Next, the target position calculation process in the positioner constant velocity status will be described with reference to FIG. 27A.

(S110) The DSP 3 calculates the target position TAGPOS in the above formula (5).

(S111) Next, the DSP 3 checks whether or not the target position TAGPOS exceeds the positioner deceleration start track position PBSF. The DSP 3_if the target position TAGPOS is over the positioner deceleration start track position PBSF, this indicates that it enters a deceleration period of the feedforward_therefore sets ON ([1]) the VCM feedforward flag. Reversely, the DSP 3, if the target position TAGPOS does not exceed the positioner deceleration start track position PBSF, sets ON ([0]) the VCM feedforward flag.

(S112) Next, the DSP 3 checks whether or not the target position TAGPOS exceeds the positioner constant velocity end track position PCE. The DSP 3, if the target position TAGPOS is not over the positioner constant velocity end track position PCE, finishes the processing. On the other hand, the DSP 3_if the target position TAGPOS is over the positioner constant velocity end track position PCE, this indicates that it exceeds the positioner constant velocity period_therefore changes the seek status signal SKSTS to [5] (positioner deceleration status). Then, the processing comes to an end.

Next, the target position calculation process in the positioner deceleration status will be explained with reference to FIG. 27B.

(S113) The DSP 3 calculates the target position TAGPOS in the above formula (6).

(S114) Next, the DSP 3 checks whether or not the target position TAGPOS exceeds the positioner deceleration end track position PBEF for the feedforward. The DSP 3_when deciding that the target position TAGPOS is over the positioner deceleration end track position PBEF, this indicates that the feedforward deceleration control period terminates_therefore sets OFF ([0]) the VCM feedforward flag. Reversely, the DSP 3_deciding that the target position TAGPOS does not exceed the feedforward positioner deceleration end track position PBEF, this indicates that the feedforward deceleration control period does note terminate_therefore sets ON ([1]) the VCM feedforward flag.

(S115) Next, the DSP 3 checks whether or not the target position TAGPOS exceeds the positioner deceleration end track position PBE. The DSP 3_if the target position TAGPOS is over the positioner deceleration end track position PBE, this indicates that it exceeds the positioner deceleration period_therefore changes the seek status signal SKSTS to [6] (lens constant velocity status). On the other hand, the DSP 3_if the target position TAGPOS does not exceed the positioner deceleration end track position PBE, this is still in the positioner deceleration period_therefore finishes the processing.

Thus, as shown in FIGS. 29 and 30, in the target velocity curve, before starting the acceleration and deceleration of the positioner 2, the application of the feedforward value is started. With this process, it is possible to compensate the delay in terms of the start of flowing the current of the VCM 23. Further, the delay caused by the sampling process can be also compensated. Accordingly, the overshoot quantity of the error quantity when applying the feedforward quantity is reduced. Therefore, the system is stabilized. That is, the track positioning during the deceleration gets easier. Also, during the acceleration, the subsequent constant velocity control can be stably executed.

Furthermore, as shown in FIG. 29, the start and end positions of the feedforward are calculated beforehand from the positions of the light beams, and hence the calculation process in the target position can be carried out at a high speed.

Note that the reason why the lens actuator is driven before driving the VCM 23 lies in preventing the light beams from traveling backward due to an eccentricity of the optical disk.

Namely, the light beams are previously accelerated faster than an eccentric velocity of the optical disk. The seek operation can be thereby performed without undergoing an influence of the eccentricity of the light beams.

In addition to the embodiment discussed above, the present invention may take the following modifications.

First, in the embodiment, the method of calculating the present position is changed by deciding the light beam velocity status from the seek status signal. The method of calculating the present position may be, however, changed by deciding the light beam velocity from the target velocity or the present velocity.

Second, the timing of applying the feedforward is controlled based on the position of the light beam. As illustrated in FIG. 30, however, the timing of applying the feedforward may be controlled based on the number of remaining samples.

Third, the timing of applying the feedforward for both of the acceleration and the deceleration is made fast. The application timing for one of the acceleration and the deceleration may also be, however, made fast.

Fourth, the optical disk may involve the use of a variety of writable and rewritable optical disks.

The present invention has been discussed so far by way of the embodiments but may take a variety of modifications within the range of the gist of the present invention, and those modifications are not excluded from the scope of the present invention.

As discussed above, according to the present invention, the method of obtaining the present position from the track error signal changes in accordance with the velocity of the light beams, and, therefore, the optimum present position can be detected corresponding to the status of the track error signal, thereby actualizing the stable seek control.

Further, the timing of applying the feedforward is controlled before the acceleration change of the target velocity curve occurs. It is therefore possible to stabilize the system by reducing the error quantity when applying the feedforward.

What is claimed is:

1. A seek control method in an optical storage device, of seek-moving a light beam of an optical head from a certain track on an optical storage medium to a desired track, said method comprising:

a step of calculating a target position;

a step of detecting a present position from a track error signal indicating a relative position between the light beam and the track;

a step of calculating such a feedback control quantity as to zeroize an error between the target position and the present position; and a step of controlling moving means for moving the light beam in accordance with the feedback control quantity, said present position detecting step including:

a first present position detecting step of detecting the present position from a signal into which the track error signal is A/D-converted when a velocity of the light beam is low; and a second present position detecting step of detecting the present position from a count value obtained by counting track zero-cross signals acquired by slicing the track error signal at a zero level when the velocity of the light beam is high.

2. The seek control method in the optical storage device according to claim 1, wherein said first present position detecting step is executed during a first period extending from a time when the seek is started to a time when the light beam reaches a first predetermined track position and during a second period extending from a time when the light beam reaches a second track position located a predetermined number of tracks anterior to a target track to a time when the seek is finished.

3. The seek control method in the optical storage device according to claim 2, wherein said first present position detecting step is executed during a period for which a track actuator for moving the light beam is driven.

4. The seek control method in the optical storage device according to claim 2, wherein said second present position detecting step is executed during a period extending from a time when reaching the first predetermined track position to a time when reaching the second predetermined track position.

5. The seek control method in the optical storage device according to claim 4, wherein said second present position detecting step is executed during a period for which said actuator for driving said optical head is driven.

6. The seek control method in the optical storage device according to claim 1, wherein said second present position detecting step includes:

a step of measuring a first interval of edges of the track zero-cross signal;

a step of measuring a second interval from the edge of the track zero-cross signal just before a certain sampling time to the sampling time; and a step of calculating the present position by dividing the second interval by the first interval.

7. The seek control method in the optical storage device according to claim 1, wherein said first present position detecting step includes:

a step of calculating the present position from an output of an analog/digital converter for performing an analog-to-digital conversion in a range where the target position exceeds −0.25 track but does not exceed +0.25 track from the center of the track;

a step of calculating the present position by adding, after inverting the output of said analog/digital converter, a value for 0.5 track to the inverted output in a range where the target position exists between 0.25 track and 0.5 track on the basis of the center of the track; and a step of calculating the present position by subtracting, after inverting the output of said analog/digital converter, a value for 0.5 track from the inverted output in a rage where the target position exists between −0.25 track and −0.5 track on the basis of the center of the track.

8. The seek control method in the optical storage device according to claim 7, wherein said step of calculating the feedback control quantity is a step of calculating such a feedback control quantity that an error between the target position and the detected position is zero in a range where the target position exists between 0.25 ±X track and −0.25 ±X track (however, X is an interval which does not exceed 0.25 track) on the basis of the center of the track.

9. The seek control method in the optical storage device according to claim 8, wherein said step of calculating the feedback control quantity is a step of calculating the feedback control quantity to be zeroized in a range where the target position exists between 0.25 ±X track and −0.25 ±X track (however, X is an interval which does not exceed 0.25 track) on the basis of the center of the track.

* * * * *